United States Patent
Shin et al.

(10) Patent No.: US 12,555,257 B2
(45) Date of Patent: Feb. 17, 2026

(54) AUGMENTED REALITY DEVICE FOR OBTAINING DEPTH INFORMATION AND METHOD OF OPERATING THE SAME

(71) Applicant: SAMSUNG ELECTRONICS CO., LTD., Suwon-si (KR)

(72) Inventors: Seunghak Shin, Suwon-si (KR); Jaeyun Jeong, Suwon-si (KR); Songhyeon Kim, Suwon-si (KR); Hyokak Kim, Suwon-si (KR); Seungjae Won, Suwon-si (KR); Seowon Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 307 days.

(21) Appl. No.: 18/199,226

(22) Filed: May 18, 2023

(65) Prior Publication Data
US 2023/0377182 A1    Nov. 23, 2023

Related U.S. Application Data

(63) Continuation of application No. PCT/KR2023/006490, filed on May 12, 2023.

(30) Foreign Application Priority Data

May 18, 2022   (KR) .................. 10-2022-0061033
Aug. 12, 2022  (KR) .................. 10-2022-0101583

(51) Int. Cl.
G06T 7/593          (2017.01)

(52) U.S. Cl.
CPC .... G06T 7/593 (2017.01); *G06T 2207/10012* (2013.01); *G06T 2207/10028* (2013.01); *G06T 2207/20081* (2013.01)

(58) Field of Classification Search
None
See application file for complete search history.

(56) References Cited

U.S. PATENT DOCUMENTS 8,098,276 B2    1/2012  Chang et al.
8,611,610 B2    12/2013 Park et al.
(Continued)

FOREIGN PATENT DOCUMENTS

EP      2 615 580 A1    7/2013
JP      7136123 B2      9/2022
(Continued)

OTHER PUBLICATIONS

Jiachen Liu et al., "PlaneMVS: 3D Plane Reconstruction from Multi-View Stereo", OPPO US Research Center, InnoPeak Technology, Inc., CVPR, 2022, (11 pages).
(Continued)

*Primary Examiner* — Heather R Jones
(74) *Attorney, Agent, or Firm* — Sughrue Mion, PLLC

(57) ABSTRACT

Provided are an augmented reality device and a method of operating the same. The augmented reality device adjusts a depth value based on a gravity direction measured by an IMU sensor in order to obtain a depth map having a high accuracy without an additional hardware module. The augmented reality device obtains a depth map from an image obtained using the camera, obtains a normal vector of at least one pixel included in the depth map, modifies a direction of the normal vector of the at least one pixel, based on the gravity direction measured by the IMU sensor, and adjusts a depth value of the at least one pixel based on the modified direction of the normal vector.

18 Claims, 18 Drawing Sheets

(56) References Cited

U.S. PATENT DOCUMENTS

| | | |
|---|---|---|
| 9,600,936 B2 | 3/2017 | Boivin et al. |
| 11,204,415 B2 | 12/2021 | Jin et al. |
| 2010/0141757 A1 | 6/2010 | Baik et al. |
| 2014/0253679 A1 | 9/2014 | Guigues et al. |
| 2015/0181198 A1* | 6/2015 | Baele ................. G06T 7/50 |
| | | 348/46 |
| 2018/0075614 A1 | 3/2018 | He |
| 2020/0103511 A1* | 4/2020 | Jin .................. G01S 7/499 |
| 2020/0322542 A1 | 10/2020 | Ricci et al. |
| 2021/0185293 A1 | 6/2021 | Schmidt et al. |
| 2021/0217191 A1 | 7/2021 | Kaizu et al. |
| 2022/0046219 A1* | 2/2022 | Obla ................ H04N 23/957 |
| 2022/0067378 A1 | 3/2022 | Rabinovich et al. |
| 2023/0222727 A1* | 7/2023 | Yoo .................. G06T 5/77 |
| | | 345/419 |

FOREIGN PATENT DOCUMENTS

| | | |
|---|---|---|
| KR | 10-0938195 B1 | 1/2010 |
| KR | 10-0942925 B1 | 2/2010 |
| KR | 10-2010-0064196 A | 6/2010 |
| KR | 10-2014-0027468 A | 3/2014 |
| KR | 10-2014-0031345 A | 3/2014 |
| KR | 10-1675112 B1 | 11/2016 |
| KR | 10-2019-0041504 A | 4/2019 |
| KR | 10-2020-0037698 A | 4/2020 |
| KR | 10-2021-0025175 A | 3/2021 |
| KR | 10-2021-0116516 A | 9/2021 |
| KR | 10-2334332 B1 | 12/2021 |

OTHER PUBLICATIONS

International Search Report and Written Opinion dated Aug. 7, 2023, issued by the International Searching Authority in International Application No. PCT/KR2023/006490 (PCT/ISA/220, PCT/ISA/210, and PCT/ISA/237).
Communication dated May 13, 2025, issued by the European Patent Office in counterpart European Application No. 23807846.3.
Communication dated Jan. 7, 2026, issued by Intellectual Property India in Indian Application No. 20247092964.

* cited by examiner

AUGMENTED REALITY DEVICE FOR OBTAINING DEPTH INFORMATION AND METHOD OF OPERATING THE SAME

CROSS-REFERENCE TO RELATED APPLICATIONS

This application is a bypass continuation of International Application No. PCT/KR2023/006490, filed on May 12, 2023, which is based on and claims priority to Korean Patent Application No. 10-2022-0061033, filed on May 18, 2022, and Korean Patent Application No. 10-2022-0101583, filed on Aug. 12, 2022, the disclosures of which are incorporated by reference herein in their entireties.

BACKGROUND

1. Field

The disclosure relates to an augmented reality device for obtaining depth information, and more particularly, to an augmented reality device that modifies a depth value of each pixel in a depth map based on a gravity direction, and a method of operating the same.

2. Description of Related Art

Augmented reality is a technology that may overlay a virtual image on a physical environment space of the real world or a real-world object, and may display the virtual image together with the real world object. An augmented reality device (e.g., smart glasses) using augmented reality technology is efficiently used in everyday life, for example, for information search, direction guidance, and camera photographing. Smart glasses, as an example of an AR device, may be worn as a fashion item and may be used for outdoor activities.

Recently, to give a user an immersive sense, a device including a depth sensor that acquires depth information indicating a sense of space of an object included in a real three-dimensional space has been widely used. Examples of a depth information acquiring technique using an existing depth sensor according to the related art may include, for example, a structured light (SL) method, a stereo vision method, a time of flight (ToF) method, etc. From among the depth information obtaining techniques, the stereo vision method and the ToF method are depth estimation methods based on a camera, and an accuracy of the depth value degrades away from the camera. In a structured light method having relatively high accuracy of depth values regarding distance or the ToF method, additional hardware modules such as an illuminator are necessary, and power consumption and additional costs may be required by the hardware modules.

Also, an augmented reality application executed by the augmented reality device mostly requires all-time constant depth information, and thus power consumption increases. Due to the characteristics of an augmented reality device that is a portable device having a compact-sized form factor, heat generation and power consumption amount largely affect available usage time of the device.

SUMMARY

Provided is an augmented reality device modifying a depth value based on a gravity direction.

According to an aspect of the disclosure, there is provided an augmented reality device including: a camera; an inertial measurement unit (IMU) sensor configured to measure a gravity direction; a memory configured to store at least one instruction; and at least one processor configured to execute the at least one instruction to: obtain a depth map from an image obtained using the camera, obtain a normal vector of at least one pixel included in the depth map, modify a direction of the normal vector of the at least one pixel, based on the gravity direction measured by the IMU sensor, and adjust a depth value of the at least one pixel, based on the modified direction of the normal vector.

The at least one processor may be further configured to: convert the at least one pixel into a three-dimensional (3D) coordinate value, based on a direction vector of the at least one pixel included in the depth map and the depth value of the at least one pixel, and obtain the normal vector by obtaining a cross-product of the 3D coordinate value of a plurality of adjacent pixels that are adjacent to the at least one pixel in any one of an upper direction, a lower direction, a left direction, and/or a right direction.

The camera may include a left-eye camera configured to obtain a left-eye image and a right-eye camera configured to obtain a right-eye image, and wherein the at least one processor may be further configured to: apply the left-eye image and the right-eye image as inputs to an artificial intelligence (AI) model, and obtain the depth map by obtaining a disparity according to a similarity in intensity values between pixels in the left-eye image and pixels in the right-eye image by using the AI model.

The at least one processor may be further configured to: obtain a loss of the depth map obtained by the AI model, based on depth values of a pixel on a plane defined by the modified normal vector and the plurality of adjacent pixels that are adjacent to the pixel, and adjust the depth value of the at least one pixel by performing a training, in which the obtained loss may be applied to the AI model.

The at least one processor may be further configured to: define the plane to include a pixel having the modified normal vector and the plurality of adjacent pixels that are adjacent to the pixel, obtain the depth values of the plurality of adjacent pixels based on a plurality of points where the defined plane and a ray vector of the camera meet each other, obtain a difference value between the depth value of the pixel and each of the depth values of the plurality of adjacent pixels, and obtain the loss by performing a weighted sum in which a weight is applied to the difference value obtained with respect to each of the plurality of adjacent pixels.

The weight may include a first weight determined based on a distance between each of the plurality of adjacent pixels in the depth map and the camera, and a second weight determined based on a difference in intensity values between the pixel of the depth map and each of the plurality of adjacent pixels.

The at least one processor may be further configured to obtain an adjusted depth map by performing inference in which the left-eye image and the right-eye image are provided to the trained AI model.

The camera may include a left-eye camera configured to obtain a left-eye image and a right-eye camera configured to obtain a right-eye image, and wherein the at least one processor may be further configured to: modify the direction of the normal vector in the left-eye image and the right-eye image according to the gravity direction or a direction perpendicular to the gravity direction, perform a plane hypothesis along the modified direction of the normal vector or a direction perpendicular to the modified direction of the normal vector, obtain the depth value of the at least one pixel by performing a plane sweep along a plane defined through the plane hypothesis, and modify the depth value of the at least one pixel by using the obtained depth value.

The camera may include a time-of-flight (ToF) camera, and wherein the at least one processor may be further configured to obtain the depth map by using the ToF camera.

The at least one processor may be further configured to: define a plane for each pixel of the at least one pixel, based on the modified normal vector, identify a plane region of the plane defined in the depth map, based on regions segmented according to color information of an RGB image, and adjust the depth value, based on depth values of adjacent pixels in the identified plane region.

According to an aspect of the disclosure, there is provided a method, performed by an augmented reality device, of adjusting a depth value, including: obtaining a depth map from an image obtained using a camera; obtaining a normal vector of at least one pixel included in the depth map; modifying a direction of the normal vector of the at least one pixel based on a gravity direction measured by an inertial measurement unit (IMU) sensor; and adjusting the depth value of the at least one pixel, based on the modified direction of the normal vector.

The obtaining of the depth map may include: providing a left-eye image obtained by using a left-eye camera and a right-eye image obtained by using a right-eye camera to an artificial intelligence (AI) model; and obtaining the depth map by obtaining a disparity according to a similarity in intensity values between pixels in the left-eye image and pixels in the right-eye image by using the AI model.

The adjusting of the depth value for each pixel of the at least one pixel in the depth map may include: obtaining a loss of the depth map obtained by the AI model, based on depth values of a pixel on a plane defined by the modified normal vector and a plurality of adjacent pixels that are adjacent to the pixel; and adjusting the depth value of the at least one pixel by performing a training, in which the obtained loss is applied to the AI model.

The identifying the loss may include: defining the plane to include a pixel having the modified normal vector and the plurality of adjacent pixels that are adjacent to the pixel; obtaining the depth values of the plurality of adjacent pixels based on a plurality of points where the defined plane and a ray vector of the camera meet each other; obtaining a difference value between the depth value of the pixel and each of the depth values of the plurality of adjacent pixels; and obtaining the loss by performing a weighted sum in which a weight is applied to the difference value obtained with respect to each of the plurality of adjacent pixels.

The weight may include a first weight determined based on a distance between each of the plurality of adjacent pixels in the depth map and the camera, and a second weight determined based on a difference in intensity values between the pixel of the depth map and each of the plurality of adjacent pixels.

The method may further include obtaining an adjusted depth map by performing inference in which the left-eye image and the right-eye image are provided to the trained AI model.

The modifying of the direction of the normal vector for each pixel may include: modifying the direction of the normal vector of a left-eye image obtained by using a left-eye camera and a right-eye image obtained by using a right-eye camera according to the gravity direction or a direction perpendicular to the gravity direction, and wherein the adjusting of the depth value of the at least one pixel may include: performing a plane hypothesis along the modified direction of the normal vector or a direction perpendicular to the modified direction of the normal vector; obtaining the depth value by performing a plane sweep along a plane defined through the plane hypothesis; and adjusting the depth value of the at least one pixel by using the obtained depth value.

The obtaining of the depth map may include obtaining the depth map by using a time-of-flight camera.

The modifying of the depth value of the at least one pixel may include: defining a plane for each pixel of the at least one pixel, based on the modified normal vector; identifying a plane region of the plane defined in the depth map based on regions segmented according to color information of an RGB image; and adjusting the depth value of the at least one pixel, based on depth values of adjacent pixels in the identified plane region.

According to an aspect of the disclosure, there is provided a non-transitory computer-readable storage medium including instructions that are executed by an augmented reality device to perform a method including: obtaining a depth map from an image obtained by a camera; obtaining a normal vector of at least one pixel included in the depth map; modifying a direction of the normal vector of the at least one pixel based on a gravity direction measured by an inertial measurement unit sensor; and adjusting a depth value of the at least one pixel, based on the modified direction of the normal vector.

According to an aspect of the disclosure, there is provided an electronic device including: a sensor configured to measure a gravity direction; a memory configured to store at least one instruction; and at least one processor configured to execute the at least one instruction to: obtain a depth map from an image, obtain a normal vector of at least one pixel included in the depth map, modify a direction of the normal vector of the at least one pixel, based on the gravity direction measured by the sensor, and adjust a depth value of the at least one pixel, based on the modified direction of the normal vector.

The at least one processor may be further configured to: convert the at least one pixel into a three-dimensional (3D) coordinate value, based on a direction vector of the at least one pixel included in the depth map and the depth value of the at least one pixel, and obtain the normal vector by obtaining a cross-product of the 3D coordinate value of a plurality of adjacent pixels that are adjacent to the at least one pixel in any one of an upper direction, a lower direction, a left direction, and/or a right direction.

The at least one processor may be further configured to: provide a left-eye image and a right-eye image obtained as inputs to an artificial intelligence (AI) model, and obtain the depth map by obtaining a disparity according to a similarity in intensity values between pixels in the left-eye image and pixels in the right-eye image by using the AI model.

The at least one processor may be further configured to: obtain a loss of the depth map obtained by the AI model, based on depth values of a pixel on a plane defined by the modified normal vector and the plurality of adjacent pixels that are adjacent to the pixel, and adjust the depth value of the at least one pixel by performing a training, in which the obtained loss is applied to the AI model.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
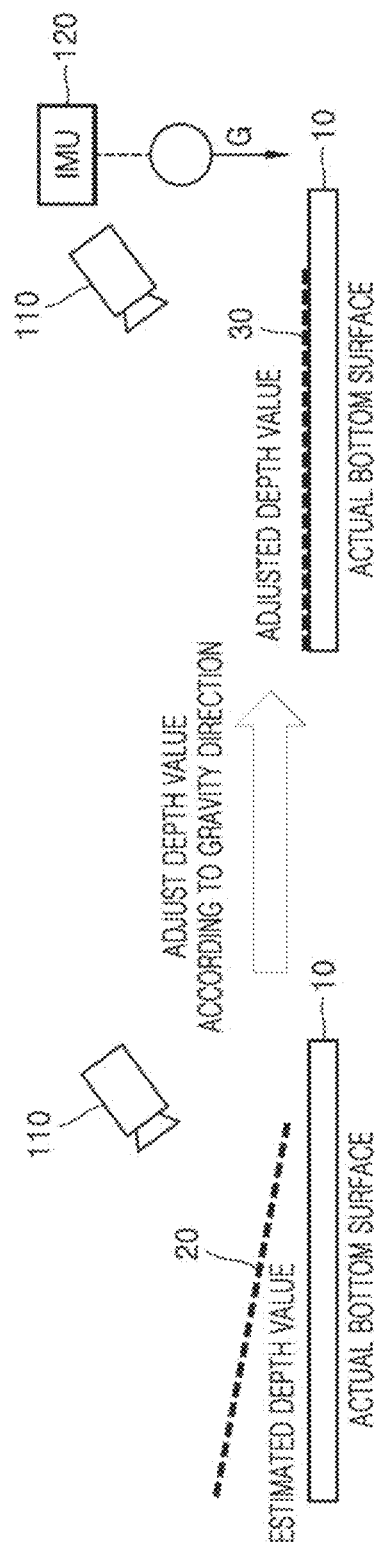
FIG. 1A is a conceptual view for illustrating a method, performed by an augmented reality device according to an embodiment of the disclosure, of adjusting a depth value.

Throughout the disclosure, the expression "at least one of a, b or c" indicates only a, only b, only c, both a and b, both a and c, both b and c, or all of a, b, and c.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description. Thus, the terms used herein have to be defined based on the meaning of the terms together with the description throughout the specification.

As used herein, the singular forms are intended to include the plural forms as well, unless the context clearly indicates otherwise. Unless defined otherwise, all terms used herein, including technical terms and scientific terms, have the same meaning as commonly understood by one of ordinary skill in the art of the present disclosure.

It will be further understood that the terms "comprises" and/or "comprising," when used in this specification, specify the presence of stated components, but do not preclude the presence or addition of one or more components. Also, the terms " . . . unit", " . . . module" used herein specify a unit for processing at least one function or operation, and this may be implemented with hardware or software or a combination of hardware and software.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "system configured to" may mean that the system, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

In addition, in the specification, when an element is referred to as being "connected to" another element, it is to be understood that the element may be directly connected to the other element, but may be connected or connected via another element in the middle, unless otherwise described.

Hereinafter, one or more embodiments of the disclosure will be described in detail with reference to accompanying drawings to the extent that one of ordinary skill in the art would be able to carry out the disclosure. However, the disclosure may be implemented in various manners, and is not limited to one or more embodiments described herein.

Hereinafter, embodiments of the disclosure will be described in detail with reference to the drawings.

FIG. 1A is a conceptual view for illustrating a method, performed by an augmented reality device, of adjusting a depth value according to an embodiment of the disclosure.

Referring to FIG. 1A, the augmented reality device may estimate a depth value 20 of an actual bottom surface 10 through an image obtained by using a camera 110. The estimated depth value 20 may be different from a depth value of the actual bottom surface 10, according to a positional relationship such as a physical distance or height difference between the actual bottom surface 10 and the camera 110. For example, when the camera 110 includes a left-eye camera and a right-eye camera, and the augmented reality device estimates the depth value 20 by the stereo vision method using a left-eye image obtained from the left-eye camera and a right-eye image obtained from the right-eye camera, an error in a disparity, that is, a distance between corresponding points of the left-eye image and the right-eye image, may increase away from the camera 110. For example, when the augmented reality estimates the depth value 20 by a time-of-flight (ToF) method, the accuracy of the estimated depth value 20 decreases away from the camera 110.

In an embodiment of FIG. 1A, the estimated depth value 20 is similar to the depth value of the actual bottom surface 10 in the region close to the camera 110, but as the distance from the camera 110 increases, the depth value may be obtained in the shape of an upward inclined shape unlike the depth value of the actual bottom surface 10.

The augmented reality device may obtain information about a gravity direction G based on a measurement value that is measured by an inertial measurement unit (IMU) sensor 120. In an embodiment of the disclosure, the IMU sensor 120 includes a gyro-sensor (gyroscope), and the augmented reality device may obtain information about the gravity direction G by using the gyroscope included in the IMU sensor 120. The augmented reality device may obtain a adjusted depth value 30 by adjusting the estimated depth value 20 based on the gravity direction G. In an embodiment shown in FIG. 1A, the adjusted depth value 30 may have a flat gradient like the actual bottom surface 10, and may have the same depth value as that of the actual bottom surface 10. A detailed method for the augmented reality device to adjust the depth value based on the information about the gravity direction G obtained through the IMU sensor 120 will be described below with reference to FIG. 1B.

Figure 1B:
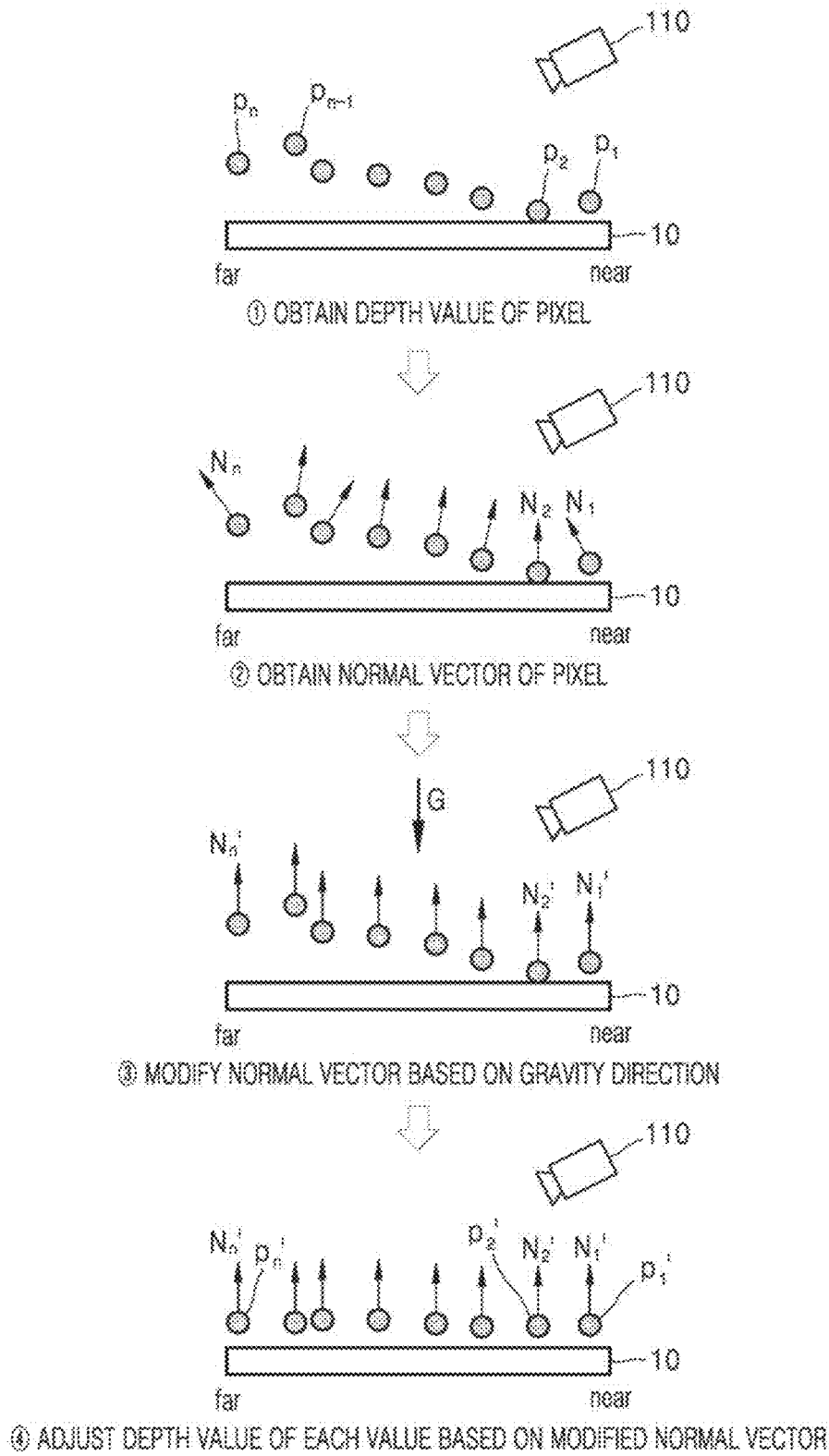
FIG. 1B is a conceptual view illustrating a method, performed by an augmented reality device according to an embodiment the disclosure, of adjusting a depth value, according to a gravity direction measured by an IMU sensor.

FIG. 1B is a conceptual view illustrating a method, by the augmented reality device according to the disclosure, of adjusting a depth value according to a gravity direction G measured by an IMU sensor.

Referring to FIG. 1B, the augmented reality device obtains a depth value of a pixel (operation ①). The augmented reality device may obtain a depth map including a plurality of pixels p1 to pn having depth values based on an image obtained by the camera 110. In an embodiment of the disclosure, the camera 110 includes the left-eye camera and the right-eye camera, and the augmented reality device may obtain the depth image through the stereo vision method by using the left-eye image obtained from the left-eye camera and the right-eye image obtained from the right-eye camera. In an embodiment of the disclosure, the camera 110 includes a ToF camera, and the augmented reality device may obtain the depth map by using the ToF camera. However, an embodiment of the disclosure is not limited thereto, and in an embodiment of the disclosure, the augmented reality device may obtain the depth map through a structured light method.

The depth values of the pixels included in the depth map may be different from those of the actual bottom surface 10 based on the distance from the camera 110. In an embodiment shown in FIG. 1B, depth values of a first pixel $p_1$ and a second pixel $p_2$ that are located relatively close to the camera 110 from among a plurality of pixels $p_1$ to $p_n$ are the same as or similar to the depth values of the actual bottom surface 10, but depth values of pixels $p_{n-1}$ and $p_n$ located far from the camera 110 may be different from the depth values of the actual bottom surface 10.

The augmented reality device obtains normal vectors $N_1$ to $N_n$ of the pixels (operation ②). In an embodiment of the disclosure, the augmented reality device may convert the plurality of pixels $p_1$ to $p_n$ into three-dimensional (3D) coordinate values based on direction vectors and depth values of the plurality of pixels $p_1$ to $p_n$ included in the depth map. The augmented reality device may obtain the normal vectors $N_1$ to $N_n$ of the plurality of pixels $p_1$ to $p_n$ by calculating a cross-product of 3D coordinate values of adjacent pixels that are arranged at positions adjacent to any one pixel in the upper and lower, left and right directions.

The augmented reality device modifies the normal vectors $N_1$ to $N_n$ based on the gravity direction (operation ③). The augmented reality device includes the IMU sensor 120 (see FIG. 1A), and may obtain information about the gravity direction G based on a measurement value that is measured by using the gyroscope of the IMU sensor 120. The augmented reality device may modify the direction of the normal vector $N_1$ to $N_n$ of the pixels according to the gravity direction G or the direction perpendicular to the gravity direction G. As a result of the modification, the augmented reality device may obtain modified normal vectors $N_1'$ to $N_n'$.

The augmented reality device adjusts a depth value for each pixel based on the modified normal vector $N_1'$ to $N_n'$ (operation ④). The augmented reality device defines a plane for each pixel according to the modified normal vector $N_1'$ to $N_n'$ and may adjust the depth value of the pixel based on the plane for each pixel. In an embodiment of the disclosure, the augmented reality device obtains the depth map by using an artificial intelligence (AI) model, calculates a loss based on depth values of the pixel on a plane defined by the modified normal vectors $N_1'$ to $N_n'$ and adjacent pixels, and adjust the depth value for each pixel by performing training, in which the calculated loss is applied to the AI model. In an embodiment of the disclosure, the augmented reality device may adjust the depth value for each pixel by performing a plane sweep according to a plane for each pixel defined based on the direction of the modified normal vectors $N_1'$ to $N_n'$. In an embodiment of the present disclosure, a plane region may be identified based on color information of an RGB image from a plane defined based on the modified normal vector $N_1'$ to $N_n'$, and a depth value for each pixel may be adjusted based on the depth values of adjacent pixels in the identified plane region.

The augmented reality device may acquire a plurality of pixels $p_1'$ to $p_n'$ having the adjusted depth values. Each of the plurality of pixels $p_1'$ to $p_n'$ may have a depth value equal to or similar to the depth of the actual bottom surface 10.

An image-based depth value acquisition method using the image acquired through the camera 110, for example, a structured light method, the stereo vision method, or the ToF method, has an issue in which the accuracy of the depth value decreases away from the camera 110. In the case of the structured light method or the ToF method having relatively high accuracy of depth values regarding distance, additional hardware modules such as an illuminator are necessary, and power consumption and additional costs may be incurred by the hardware modules. In addition, because augmented reality applications mostly need depth information at all times, there is an issue of increasing the power consumption of the augmented reality device. Due to the characteristics of the augmented reality devices that are portable devices with compact-sized form factors, heat generation and power consumption may greatly affect a device availability time.

The disclosure provides an augmented reality device capable of obtaining depth values having high accuracy by using the gravity direction G information obtained through the IMU sensor 120 (see FIG. 1A) without unnecessary power consumption of additional hardware modules (e.g., light-emitting unit module), and a method of operating the same.

In an embodiment shown in FIGS. 1A and 1B, the augmented reality device modifies the direction of the normal vectors $N_1$ to $N_n$ of each pixel based on the gravity direction G information obtained by using the IMU sensor 120, and adjusts the depth value for each pixel based on the modified normal vectors $N_1'$ to $N_n'$ so as to obtain the depth map having high accuracy and reduce power consumption. Also, the augmented reality device generally includes the IMU sensor 120 as an essential element, and the augmented reality device according to an embodiment of the disclosure may implement lower power consumption while maintaining compact-sized form factor, and accordingly, there are provided technical effects of increasing portability and device usage time.

Figure 2:
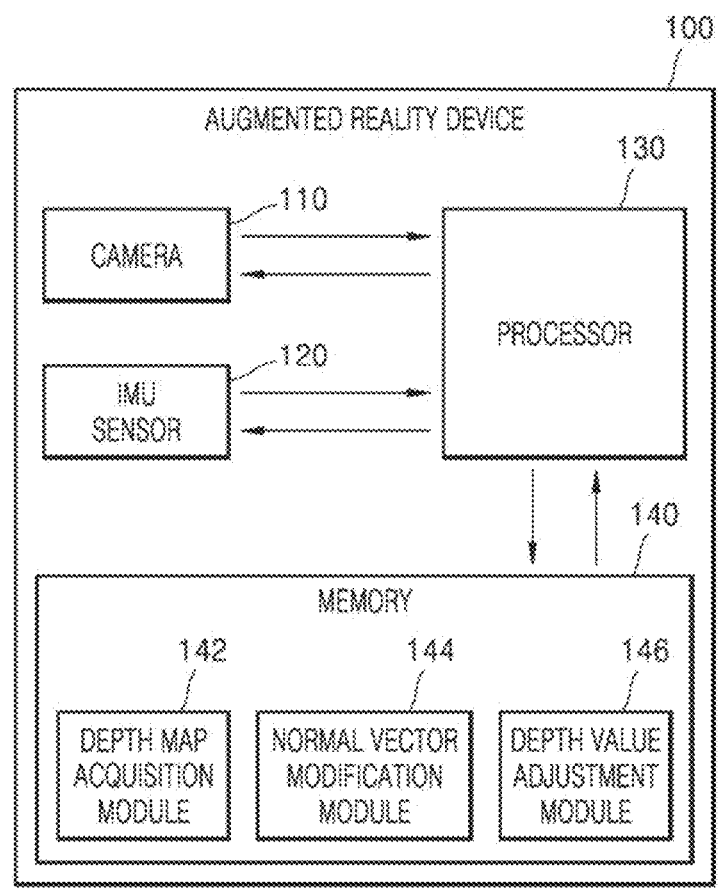
FIG. 2 is a block diagram of an augmented reality device according to an embodiment of the disclosure.

FIG. 2 is a block diagram of an augmented reality device 100 according to an embodiment of the disclosure.

The augmented reality device 100 may be augmented reality glasses formed in the shape of glasses worn on the face of a user. The augmented reality device 100 may provide virtual image content displayed on a waveguide, as well as a real-world object within a field of view (FOV), by executing an application. The augmented reality device 100 may provide the user with virtual image content displayed on each application, by executing, for example, a movie application, a music application, a photo application, a gallery application, a web-browser application, an e-book application, a game application, an augmented reality application, a social network service (SNS) application, a messenger application, an object detection application, etc.

However, an embodiment of the disclosure is not limited thereto, and the augmented reality device 100 may be implemented as a head mounted display apparatus (HMD), an augmented reality helmet, etc. worn on the head of the user. However, the augmented reality device 100 according to the disclosure is not limited to the above examples. In an embodiment of the disclosure, the augmented reality device 100 may be implemented in the form of various devices such as a mobile device, a smartphone, a laptop computer, a tablet PC, an e-book terminal, a digital broadcasting terminal, a personal digital assistant (PDA), a portable multimedia player (PMP), a navigation device, an MP3 player, an internet protocol television (IPTV), a digital TV (DTV), a wearable device, etc.

Referring to FIG. 2, the augmented reality device 100 may include the camera 110, the IMU sensor 120, a processor 130, and a memory 140. The camera 110, the IMU sensor 120, the processor 130, and the memory 140 may be electrically and/or physically connected to one another. Elements included in augmented reality device 100 are not limited to the example shown in FIG. 2. In an embodiment of the disclosure, the augmented reality device 100 may further include an eye-tracking sensor and/or a display engine.

The camera 110 obtain an image about the object by capturing an image of an object in a real word space. In an embodiment of the disclosure, the camera 110 may include a lens module, an image sensor, and an image processing module. The camera 110 may obtain a still image or a video acquired by the image sensor (e.g., a complementary metal oxide semiconductor (CMOS) or a charge coupled device (CCD)). The image processing module processes the still image or the video obtained by the image sensor to extract necessary information, and transfers extracted information to the processor 130.

In an embodiment of the disclosure, the camera 110 may include a stereo camera that includes a left-eye camera and a right-eye camera and obtains a 3D image of an object by using the two cameras. However, an embodiment of the disclosure is not limited thereto, and the camera 110 may include a single camera or three or more multi-cameras.

In an embodiment of the disclosure, the camera 110 may include a ToF camera that irradiates light to an object, detects light reflected from the object, and obtains a depth value of the object based on a time-of-flight that is a difference between a time point when the reflected light is detected and a time point when the light is irradiated. When being implemented as the ToF camera, the camera 110 may obtain an RGB image 1500 (see FIG. 15) and a depth map image 1510 (see FIG. 15) along with each other.

The IMU sensor 120 is a sensor configured to measure a velocity, direction, angle, and an acceleration of gravity of the augmented reality device 100 through a combination of an accelerometer, a gyroscope, and a magnetometer. In an embodiment of the disclosure, the IMU sensor 120 may include a tri-axis accelerometer that measures accelerations in the column direction, transverse direction, and height direction, and a tri-axis angular velocity meter that measures roll, pitch, and yaw-angular velocities. In an embodiment of the disclosure, the IMU sensor 120 measures the angular velocity of the gyroscope and may sense the gravity direction based on the measured angular velocity. The IMU sensor 120 may provide the processor 130 with information about the gravity direction.

The processor 130 may execute one or more instructions of a program stored in the memory 140. The processor 130 may include a hardware element performing calculation, logic, input/output operation, and signal processing. The processor 130 may include, for example, at least one hardware element from among a central processing unit (CPU), a microprocessor, a graphic processing unit (GPU), an application specific integrated circuit (ASIC), a digital signal processor (DSP), a digital signal processing device (DSPD), a programmable logic device (PLD), and a field programmable gate array (FPGA).

In an embodiment of the disclosure, the processor 130 may include an AI processor performing AI learning. An AI processor may be manufactured in the form of a hardware chip exclusive for the AI, or may be manufactured as a part of an existing universal processor (e.g., CPU or an application processor) or a graphic-exclusive processor (e.g., GPU) and loaded on the augmented reality device 100.

FIG. 2 shows the processor 130 as one element, but an embodiment of the disclosure is not limited thereto. In an embodiment of the disclosure, the processor 130 may include one or a plurality of elements.

The memory 140 may include, for example, a storage medium of at least one type of a flash memory type, a hard disk type, a multimedia card micro type, a card type memory (e.g., an SD or XD memory, etc.), random access memory (RAM), a static RAM (SRAM), a read-only memory (ROM), an electrically erasable programmable ROM (EEPROM), a programmable (PROM), a magnetic memory, a magnetic disk, and an optical disk.

The memory 140 may store instructions related to functions or operations of the augmented reality device 100 for obtaining depth value information of the object. In an embodiment of the disclosure, the memory 140 may store at least one of instructions, algorithm, data structure, program codes, or application programs that the processor 130 may read. The instructions, algorithms, data structures, and program code stored in the memory 140 may be implemented in, for example, programming or scripting languages such as C, C++, Java, assembler, etc.

The memory 140 may store instructions, algorithms, data structures, or program codes regarding a depth map acquisition module 142, a normal vector modification module 144, and a depth value adjustment module 146. The 'modules' included in the memory 140 refer to units for processing a function or operation performed by the processor 130, which may be implemented in software such as instructions, algorithms, data structures, or program codes.

In an embodiment below, the processor 130 may be implemented by executing instructions or program codes stored in the memory 140.

The depth map acquisition module 142 includes instructions or program codes related to functions and/or operations of obtaining a depth map about an object based on the image obtained by using the camera 110. In an embodiment of the disclosure, the depth map acquisition module 142 may be configured to obtain a depth map by using an AI model. The processor 130 may obtain the depth map by executing instructions or program codes related to the depth map acquisition module 142. In an embodiment of the disclosure, the camera 110 may include a stereo camera including a left-eye camera and a right-eye camera. In this case, the processor 130 may input a left-eye image obtained by using the left-eye camera and a right-eye image obtained by using the right-eye camera into the AI model, and may calculate a disparity according to similarity between pixel intensity values of the left-eye image and the right-eye image by using the AI model so as to obtain the depth map. The AI model may be implemented as a deep neural network model. The deep neural network model may be a known artificial intelligence model such as a convolutional neural network (CNN) model, a recurrent neural network (RNN) model, a restricted Boltzmann machine (RBM), a deep belief network (DBN), a bidirectional recurrent deep neural network (BRDNN), or deep Q-networks. The deep neural network model used to obtain the depth map may include, but is not limited to, for example, DispNet.

In an embodiment of the disclosure, the processor 130 may obtain the depth map by calculating the disparity between the left-eye image and the right-eye image by using a plane sweep method.

In an embodiment of the disclosure, the camera 110 may include a ToF camera, and the processor 130 may calculate a time-of-flight that is a time difference between a time point when the reflected light that is obtained by using the ToF camera is detected and a time point when a clock signal is input, and calculate the distance between the position where the reflected light is detected and the augmented reality device 100, that is, the depth value, through a calculation between the time-of-flight and the optical velocity. The processor 130 may obtain information about the positions where the light is irradiated and the reflected light is detected, and may obtain the depth map by mapping the calculated depth value to the obtained position information.

The normal vector modification module 144 includes instructions or programs related to functions and/or operations of obtaining a normal vector of each of a plurality of pixels included in the depth map and modifying the normal vector according to the gravity direction obtained by the IMU sensor 120. The processor 130 may obtain the normal vector of at least one pixel and modify the direction of the obtained normal vector by executing the instructions or program codes related to the normal vector modification module 144. In an embodiment of the disclosure, the processor 130 may obtain the normal vector for each pixel by converting each of the plurality of pixels into a 3D coordinate value based on the direction vector of the plurality of pixels included in the depth map and the depth values of the plurality of pixels and calculating the cross-product of the 3D coordinate values of the pixels adjacent to each of the converted pixels in the up and down and left and right directions.

The processor 130 may obtain information about the gravity direction based on the measurement value measured by the gyroscope in the IMU sensor 120 and modify the direction of the normal vector for each pixel based on the gravity direction. In an embodiment of the disclosure, the processor 130 may modify the direction of the normal vector for each pixel according to the direction perpendicular to the gravity direction, as well as the gravity direction. For example, with respect to the pixel having the normal vector that is close to the vertical direction, the processor 130 may modify the direction of the normal vector to be the direction parallel to the gravity direction. For example, with respect to the pixel having the normal vector that is nearly parallel to the ground (e.g., pixel indicating an object such as wall, pillar, etc.), the processor 130 may modify the direction of the normal vector to be the direction perpendicular to the gravity direction.

A detailed example in which the processor 130 obtains the normal vector for each pixel and modify the direction of the obtained normal vector will be described in detail with reference to FIGS. 4, 5, 6A, and 6B.

The depth value adjustment module 146 includes instructions or program codes related to functions and/or operations of adjusting the depth value of at least one pixel in the depth map based on the direction of the modified normal vector. The processor 130 may adjust the depth value of at least one pixel by executing the instructions or program codes related to the depth value adjustment module 146. In an embodiment of the disclosure, the processor 130 may adjust the depth value of at least one pixel in the depth map by calculating a loss of the depth map output from the training process of the AI model and performing the training for applying the calculated loss to the AI model. The processor 130 may calculate the loss based on the depth value of the pixel on a plane defined by the modified normal vector and depth values of adjacent pixels that are adjacent in position. In an embodiment of the disclosure, the processor 130 may obtain depth values of adjacent pixels based on a plurality of points where the defined plane and a ray vector of the camera 110 meet each other, calculate a difference between the depth value of the pixel and the depth values of the adjacent pixels, and calculate the loss through a weighted sum that applies a weight to the difference that is calculated for each of adjacent pixels.

In an embodiment of the disclosure, the weight applied in the weighted sum calculation may include a first weight that is determined based on the distance between the locations of the adjacent pixels in the depth map and the position of the camera 110, and a second weight that is determined based on a difference between intensity values of the pixel in the depth map and the adjacent pixels. A detailed example in which the processor 130 calculates the loss according to the positional relationship between the plane defined by the modified normal vector and the camera 110 and adjusts the depth value of at least one pixel by training the AI model by using the calculated loss will be described in detail below with reference to FIGS. 7 to 10.

In an embodiment of the disclosure, the processor 130 may obtain the depth value of at least one pixel by assuming a plane for each pixel along the direction of the modified normal vector or the direction perpendicular to the direction of the modified normal vector (plane hypothesis) and performing the plane sweep according to the assumed plane. The processor 130 may adjust the depth value of at least one pixel in the depth map by using the obtained depth value. A detailed example in which the processor 130 adjusts the depth value of at least one pixel by performing the plane sweep along the plane defined based on the modified normal vector will be described later in detail with reference to FIGS. 12 and 13.

In an embodiment of the disclosure, the processor 130 may obtain an RGB image and a depth map image by using the ToF camera. The processor 130 may define the plane for each pixel in the depth map image based on the modified normal vector and identify a plane region in the depth map image based on the area segmented according to color information of the RGB image. The processor 130 may adjust the depth value of the pixel to be adjusted in the identified plane region based on the depth values of the adjacent pixels in the same plane region. Here, the 'pixel to be adjusted' denotes a pixel of which the depth value needs to be adjusted, and a pixel having no depth value (pixel of which the depth value is not obtained) in the plane area or a pixel of which the difference from the depth values of the adjacent pixels in the plane area exceeds a preset critical value. A detailed example in which the processor 130 identifies the plane area according to the RGB image from the depth map image obtained by using the ToF camera, and adjusts the depth value of at least one pixel in the identified plane area, will be described later with reference to FIGS. 14 and 15 in detail.

Figure 3:
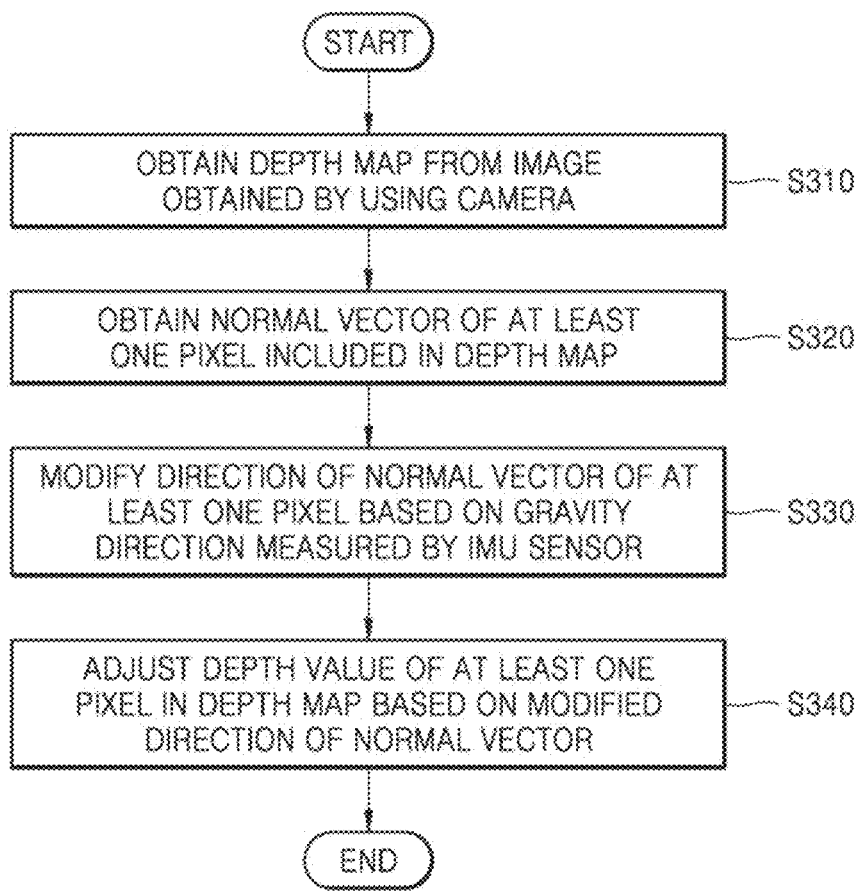
FIG. 3 is a flowchart illustrating a method of operating an augmented reality device according to an embodiment of the disclosure.

FIG. 3 is a flowchart illustrating a method of operating the augmented reality device 100 according to an embodiment of the disclosure.

In operation S310, the augmented reality device 100 obtains the depth map from the image obtained by the camera. In an embodiment of the disclosure, the camera may be a stereo camera including the left-eye camera and the right-eye camera, and the augmented reality device 100 may obtain the depth map by inputting the left-eye image obtained by the left-eye camera and the right-eye image obtained by the right-eye camera into the AI model and calculating the disparity according to a similarity between the pixel intensity values of the left-eye image and the right-eye image by using the AI model. The AI model may be implemented as a deep neural network model. The deep neural network model used to obtain the depth map may include, but is not limited to, for example, DispNet.

In an embodiment of the disclosure, the augmented reality device 100 may obtain the depth map by calculating the disparity between the left-eye image and the right-eye image by using a plane sweep method.

In an embodiment of the disclosure, the camera includes the ToF camera, and the augmented reality device 100 may obtain the depth map based on the time-of-flight of the light obtained by using the ToF camera.

In operation S320, the augmented reality device 100 obtains the normal vector of at least one pixel included in the depth map. In an embodiment of the disclosure, the augmented reality device 100 may convert the plurality of pixels into three-dimensional coordinate values based on direction vector and depth value of each of the plurality of pixels included in the depth map. The augmented reality device 100 may obtain the normal vector for each pixel by using the converted 3D coordinate value.

In operation S330, the augmented reality device 100 modifies the direction of the normal vector of at least one pixel based on the gravity direction measured by the IMU sensor. When the pixel has the normal vector that is close to the vertical direction, the augmented reality device 100 may modify the direction of the normal vector as the direction parallel to the gravity direction. When the pixel has the normal vector that is close to the horizontal direction with respect to the ground, the augmented reality device 100 may modify the direction of the normal vector as the direction perpendicular to the gravity direction.

In operation S340, the augmented reality device 100 adjusts the depth value of at least one pixel in the depth map based on the modified direction of the normal vector. When the depth map is obtained by using the AI model in operation S310, the augmented reality device 100 may adjust the depth value of at least one pixel included in the depth map by calculating a loss of the depth map obtained during the training process of the AI model and performing a training in which the calculated loss is applied to the AI model. The augmented reality device 100 may calculate the loss based on the depth value of the pixel on a plane defined by the modified normal vector and depth values of adjacent pixels that are adjacent in position. In an embodiment of the disclosure, the augmented reality device 100 may obtain depth values of adjacent pixels based on a plurality of points where the defined plane and a ray vector of the camera meet each other, calculate a difference between the depth value of the pixel and the depth values of the adjacent pixels, and calculate the loss through a weighted sum that applies a weight to the difference that is calculated for each of adjacent pixels. In an embodiment of the disclosure, the augmented reality device 100 may obtain the loss through the weighted sum using the first weight that is determined based on the distance between the positions of the adjacent pixels in the depth map and the position of the camera, and the second weight that is determined based on the difference between the intensity values of the pixel in the depth map and the adjacent pixels.

In an embodiment of the disclosure, the augmented reality device 100 may perform the plane hypothesis in which the plane for each pixel is defined according to the modified direction of the normal vector or the direction perpendicular to the modified direction of the normal vector. The augmented reality device 100 may obtain the depth value of at least one pixel by performing the plane sweep along the plane defined through the plane hypothesis. The augmented reality device 100 may adjust the depth value of at least one pixel included in the depth map by using the obtained depth value.

When the depth map is obtained by using the ToF camera in operation S310, the augmented reality device 100 may obtain the RGB image by using the ToF camera. In an embodiment of the disclosure, the augmented reality device 100 may define a plane for each pixel in the depth map based on the modified normal vector, and may identify the plane area in the depth map based on the area segmented according to the color information of the RGB image. The augmented reality device 100 may adjust the depth value of the pixel to be modified in the identified plane area based on the depth values of the adjacent pixels in the same plane.

Figure 4:
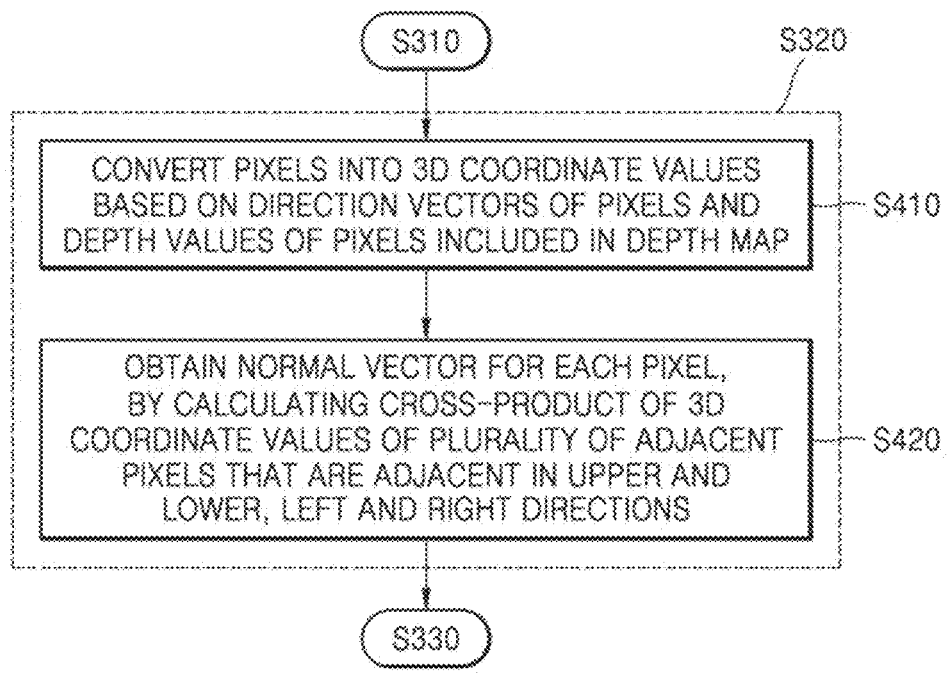
FIG. 4 is a flowchart illustrating a method, performed by an augmented reality device, of obtaining a normal vector for each pixel, according to an embodiment of the disclosure.

FIG. 4 is a flowchart illustrating a method, performed by the augmented reality device 100, of obtaining a normal vector for each pixel, according to an embodiment of the disclosure.

Operations S410 and S420 shown in FIG. 4 are details of operation S320 shown in FIG. 3. Operation S410 shown in FIG. 4 may be performed after performing operation S310 of FIG. 3. After performing operation S420 of FIG. 4, operation S330 of FIG. 3 may be performed.

Figure 5:
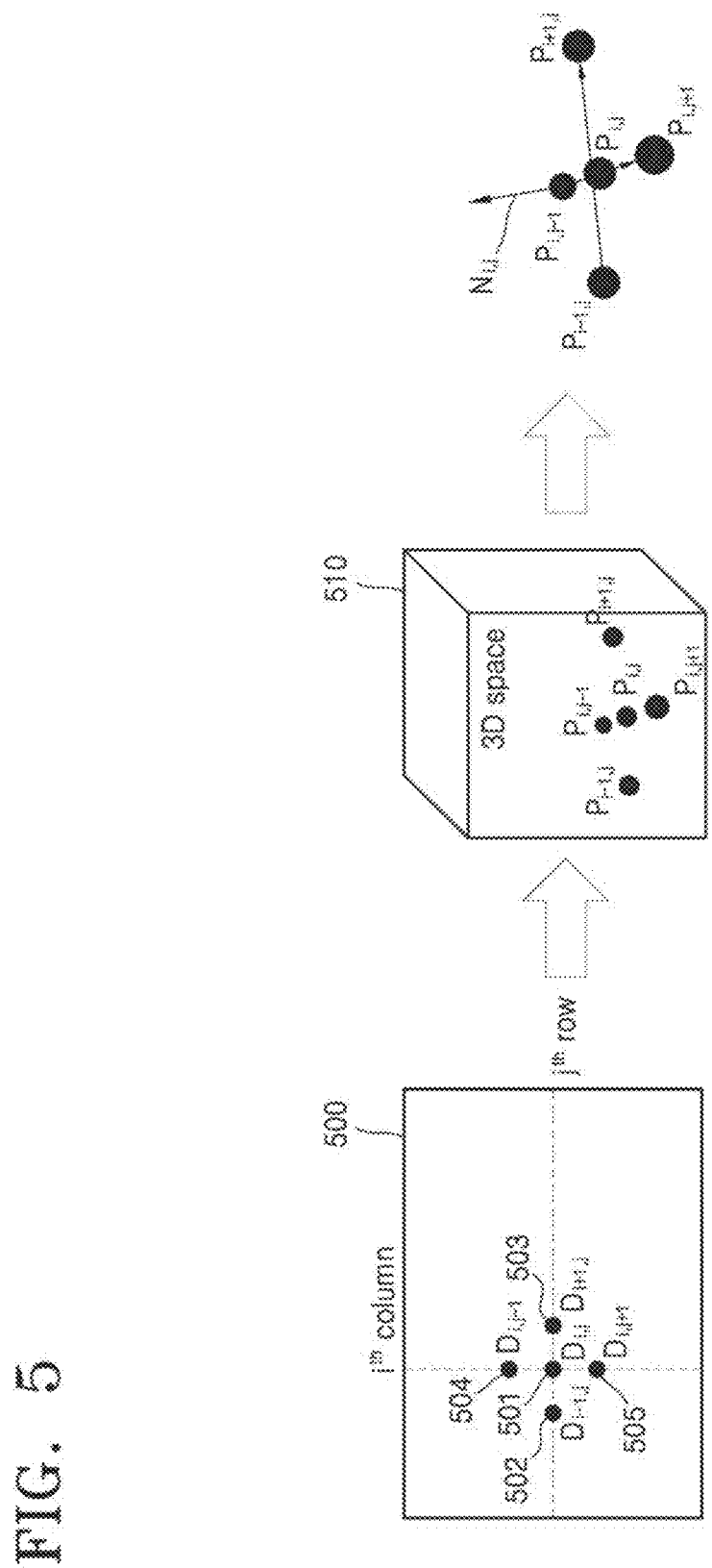
FIG. 5 is a diagram illustrating an operation, by an augmented reality device, of obtaining a normal vector for each pixel from a depth map, according to an embodiment of the disclosure.

FIG. 5 is a diagram illustrating an operation, performed by the augmented reality device 100, of obtaining a normal vector for each pixel from a depth map, according to an embodiment of the disclosure.

Hereinafter, operations of the augmented reality device 100 will be described below with reference to FIGS. 4 and 5.

Referring to operation S410 of FIG. 4, the augmented reality device 100 may convert the pixels into 3D coordinate values based on the direction vectors of the pixels included in the depth map and the depth values of the pixels. Referring to FIG. 5, the processor 130 (see FIG. 2) of the augmented reality device 100 may obtain a direction vector and a depth value $D_{i,j}$ of a first pixel 501 and direction vectors and depth values $D_{i-1,j}$, $D_{i+1,j}$, $D_{i,j-1}$, $D_{i,j+1}$ of a plurality of adjacent pixels 502 to 505 from a depth map 500. In an embodiment of FIG. 5, the first pixel 501 denotes a pixel at an i-th column and a j-th row from among the plurality of pixels included in the depth map 500, and may have a depth value of $D_{i,j}$. The plurality of adjacent pixels 502 to 505 are pixels that are arranged adjacent to the first pixel 501 in the upper and lower directions and the left and right directions, and may respectively have depth values of $D_{i-1,j}$, $D_{i+1,j}$, $D_{i,j-1}$, $D_{i,j+1}$. For example, the second pixel 502 is a pixel arranged at an i−1st column and the j-th row and has a depth value of $D_{i-1,j}$, and the third pixel 503 is a pixel arranged at an i+1st column and the j-th row and may have a depth value of $D_{i+1,j}$. The fourth pixel 504 and the fifth pixel 505 may respectively have depth values of $D_{i,j-1}$ and $D_{i,j+1}$.

The processor 130 may convert the first pixel 501 and the plurality of adjacent pixels 502 to 505 into 3D coordinate values $P_{i,j}$, $P_{i-1,j}$, $P_{i+1,j}$, $P_{i,j-1}$, $P_{i,j+1}$ in a 3D space 510, based on the direction vector and the depth value $D_{i,j}$ of the first pixel 501 and the direction vectors and the depth values $D_{i-1,j}$, $D_{i+1,j}$, $D_{i,j-1}$, $D_{i,j+1}$ of the plurality of adjacent pixels 502 to 505. In an embodiment of the disclosure, the processor 130 may convert the first pixel 501 and the plurality of adjacent pixels 502 to 505 into the 3D coordinate values on the 3D space 510 through equation 1 below.

$$P_{i,j}=K^{-1}[i,j,1]^{T}*D_{i,j}$$ [Equation 1]

In an embodiment shown in FIG. 5, the processor 130 may respectively convert the first pixel 501 into $P_{i,j}$, and the plurality of adjacent pixels 502 to 505 respectively into $P_{i-1,j}$, $P_{i+1,j}$, $P_{i,j-1}$, $P_{i,j+1}$ through equation 1 above.

Referring to operation S420 of FIG. 4, the augmented reality device 100 may obtain the normal vector for each pixel by calculating the cross-product of the 3D coordinate values of the plurality of adjacent pixels that are adjacent to the pixel 501 in the upper and lower directions and the left and right directions. Referring to FIG. 5, the processor 130 of the augmented reality device 100 may calculate the cross-products of the 3D coordinate values $P_{i-1,j}$, $P_{i+1,j}$, $P_{i,j-1}$, $P_{i,j+1}$ of the plurality of adjacent pixels based on the 3D coordinate value $P_{i,j}$ of the first pixel. In an embodiment of the disclosure, the processor 130 may obtain the normal vector $N_{i,j}$ regarding the first pixel through the operation of equation 2 below.

$$N_{i,j}=(P_{i-1,j}-P_{i+1,j})\times(P_{i,j-1}-P_{i,j+1})$$ [Equation 2]

In an embodiment of the disclosure shown in FIG. 5, through the operation of equation 2 above, the processor 130 may obtain the normal vector $N_{i,j}$ of the first pixel by calculating a difference between 3D coordinate values $(P_{i-1,j}, P_{i+1,j})$ of the second and third pixels that are adjacent to the first pixel in the left and right directions and a difference between 3D coordinate values $(P_{i,j-1}, P_{i,j+1})$ of the fourth and fifth pixels that are adjacent to the first pixel in the upper and lower directions, and calculating a vector product of the differences. The normal vector $N_{i,j}$ may be a vector defining a plane including the first to fifth pixels.

Figure 6A:
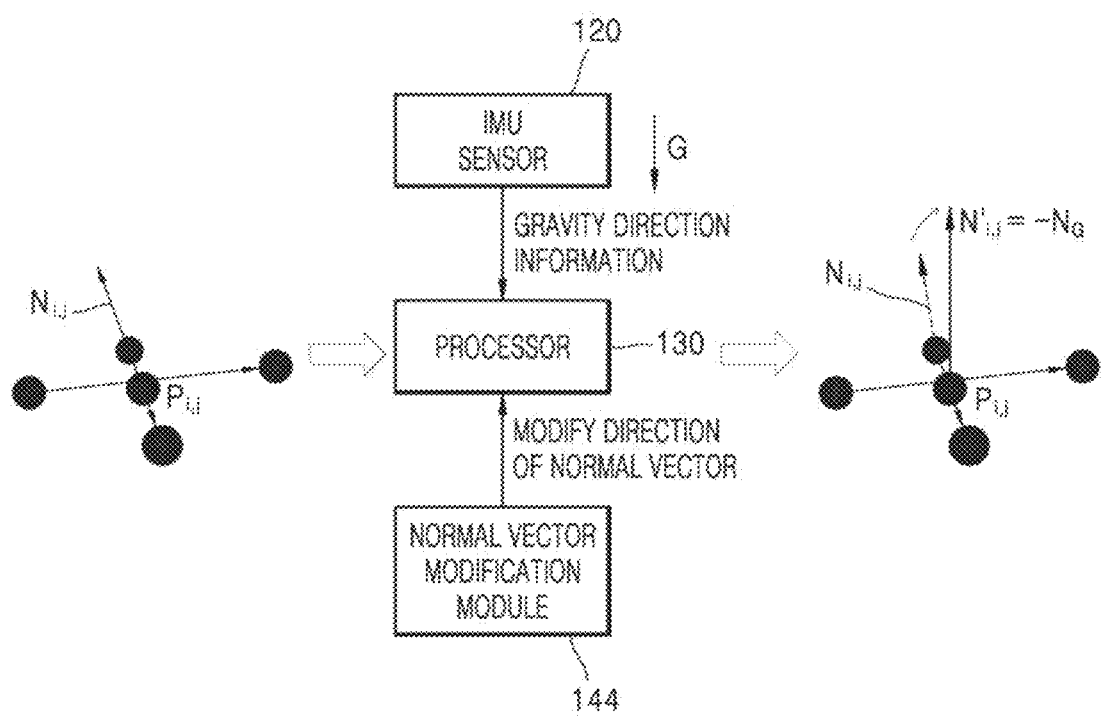
FIG. 6A is a diagram showing an operation, performed by an augmented reality device, of modifying a direction of a normal vector according to a gravity direction, according to an embodiment of the disclosure.

FIG. 6A is a diagram showing an operation, performed by the augmented reality device 100, of modifying a direction of a normal vector $N_{i,j}$ according to a gravity direction G according to an embodiment of the disclosure.

Referring to FIG. 6A, the augmented reality device 100 may include the IMU sensor 120, the processor 130, and the normal vector modification module 144. FIG. 6A only shows essential elements for describing the operation of the augmented reality device 100 for modifying the direction of the normal vector $N_{i,j}$, and the elements included in the augmented reality device 100 are not limited to the example of FIG. 6A.

The IMU sensor 120 obtains information about the gravity direction G based on a measurement value measured by using the gyroscope, and may provide the processor 130 with the information about the gravity direction G. The processor 130 may modify the direction of the normal vector $N_{i,j}$ based on the information about the gravity direction G obtained from the IMU sensor 120, by executing instructions or program codes of the normal vector modification module 144. In an embodiment of the disclosure, the processor 130 may determine whether the direction of the normal vector $N_{i,j}$ is close to the vertical direction or to the horizontal direction, and when the direction of the normal vector is close to the vertical direction, the processor 130 may modify the direction of the normal vector $N_{i,j}$ according to a gravity normal vector $-N_G$ that is parallel to the gravity direction G. In an embodiment shown in FIG. 6A, because the direction of the normal vector $N_{i,j}$ is close to the vertical direction, the processor 130 may modify the direction of the normal vector $N_{i,j}$ as the direction parallel to the gravity normal vector $-N_G$. As a result of modification, the processor 130 may obtain the modified normal vector $N'_{i,j}$.

The processor 130 may modify the direction of the plane defined by the 3D coordinate value $P_{i,j}$ of the first pixel according to the modified direction of the normal vector $N'_{i,j}$. In an embodiment of the disclosure, the processor 130 may modify the direction of the plane as much as an angle difference between the modified normal vector $N'_{i,j}$ and the normal vector $N_{i,j}$ before modification.

Figure 6B:
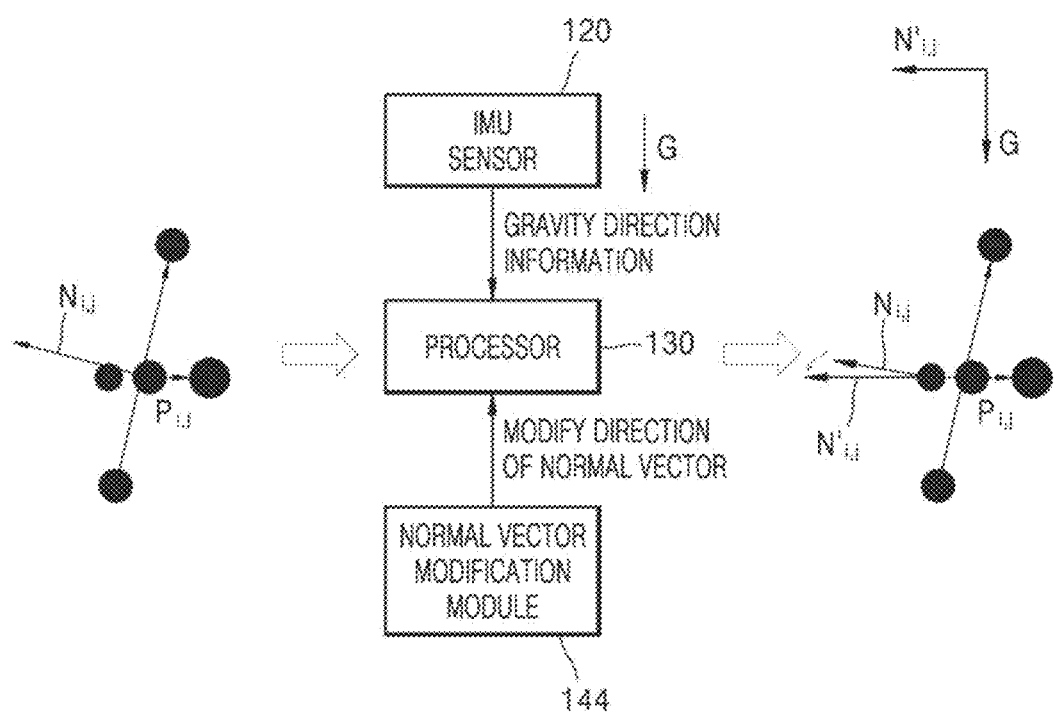
FIG. 6B is a diagram showing an operation, performed by an augmented reality device, of modifying a direction of a normal vector in a direction perpendicular to a gravity direction, according to an embodiment of the disclosure.

FIG. 6B is a diagram showing an operation, performed by the augmented reality device 100, of modifying a direction of the normal vector $N_{i,j}$ to be the direction perpendicular to the gravity direction G, according to an embodiment of the disclosure.

An embodiment of FIG. 6B is the same as an embodiment of FIG. 6A except for the direction of the normal vector $N_{i,j}$ of the first pixel and the direction of the modified normal vector $N'_{i,j}$ and thus redundant descriptions are omitted.

The processor 130 may modify the direction of the normal vector $N_{i,j}$ based on the information about the gravity direction G obtained from the IMU sensor 120, by executing instructions or program codes of the normal vector modification module 144. In an embodiment of the disclosure, the processor 130 may determine whether the direction of the normal vector $N_{i,j}$ is close to the vertical direction or the horizontal direction. The pixel, of which the direction of the normal vector $N_{i,j}$ is close to the horizontal direction, may be a pixel indicating, for example, wall, pillar, etc., or a pixel indicating an object arranged in the vertical direction. When it is determined that the normal vector $N_{i,j}$ is close to the horizontal direction, the processor 130 may modify the direction of the normal vector $N_{i,j}$ according to the direction perpendicular to the gravity direction G. In an embodiment of FIG. 6B, because the direction of the normal vector $N_{i,j}$ is close to the horizontal direction, the processor 130 may modify the direction of the normal vector $N_{i,j}$ in the direction perpendicular to the gravity direction G. As a result of modification, the processor 130 may obtain the modified normal vector $N'_{i,j}$.

The processor 130 may modify the direction of the plane defined by the 3D coordinate value $P_{i,j}$ of the first pixel according to the modified direction of the normal vector $N'_{i,j}$. In an embodiment of the disclosure, the processor 130 may modify the direction of the plane as much as an angle difference between the modified normal vector $N'_{i,j}$ and the normal vector $N_{i,j}$ before modification.

Figure 7:
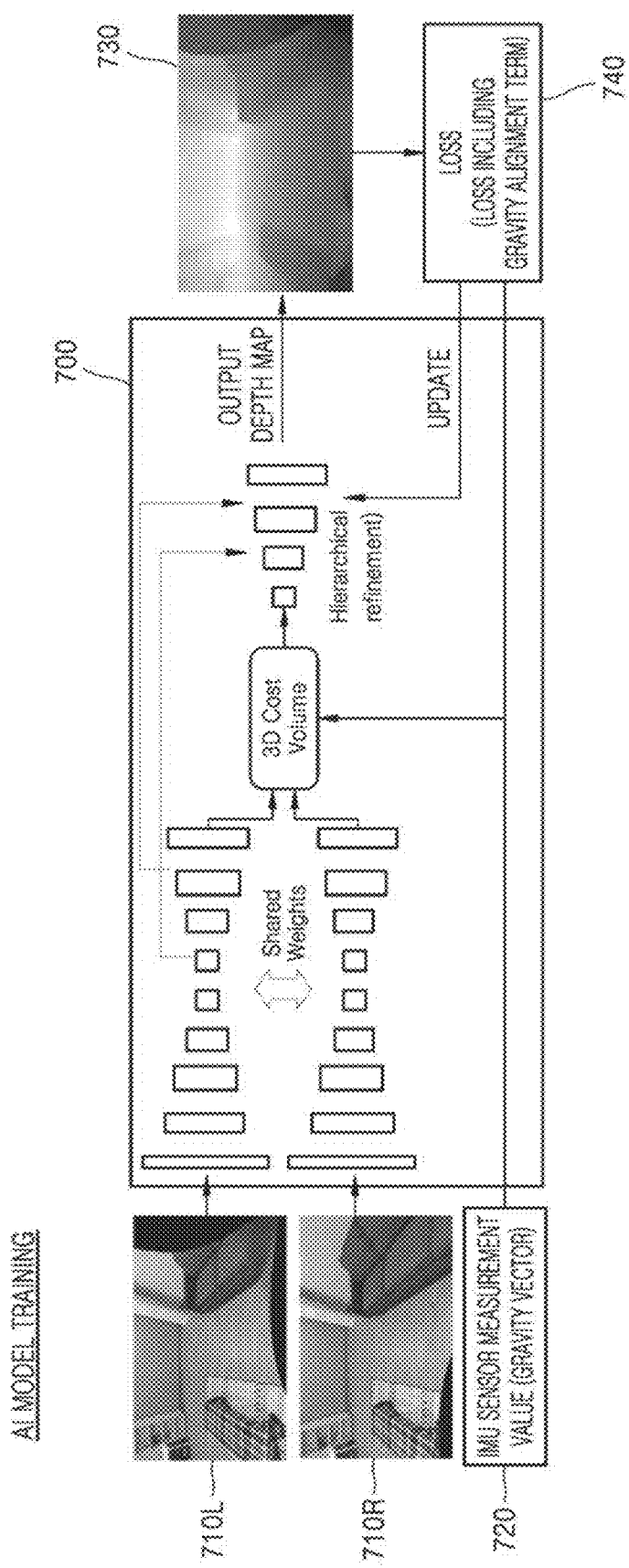
FIG. 7 is a diagram illustrating a training operation, in which an augmented reality device according to an embodiment of the disclosure obtains a depth map by using an artificial intelligence model.

FIG. 7 is a diagram illustrating a training operation, in which the augmented reality device 100 according to an embodiment of the disclosure obtains a depth map 730 by using an AI model 700.

Referring to FIG. 7, the augmented reality device 100 may include a stereo camera including a left-eye camera and a right-eye camera. The augmented reality device 100 may input a left-eye image 710L obtained by using the left-eye camera and a right-eye image 710R obtained by using the right-eye camera to the AI model 700. The augmented reality device 100 may obtain the depth map 730 by calculating the disparity according to the similarity between the intensity values of pixels in the left-eye image 710L and the right-eye image 710R by using the AI model 700.

In an embodiment of the disclosure, the AI model 700 may be implemented as a deep neural network model. The deep neural network model may be a known artificial intelligence model such as a convolutional neural network (CNN) model, a recurrent neural network (RNN) model, a restricted Boltzmann machine (RBM), a deep belief network (DBN), a bidirectional recurrent deep neural network (BRDNN), or deep Q-networks. For example, the deep neural network model used to obtain the depth map 730 may include, but is not limited to, DispNet.

For example, when the AI model 700 is implemented as a CNN such as DispNet, the AI model 700 may extract a feature map by convoluting each of the left-eye image 710L and the right-eye image 710R. During the process of extracting feature maps respectively from the left-eye image 710L and the right-eye image 710R, weights may have the same values and may be shared. The AI model 700 may be trained so as to output the depth map 730 by performing hierarchical refinement, in which the difference between the feature maps respectively extracted from the left-eye image 710L and the right-eye image 710R is accumulated as a 3D cost volume and the accumulated 3D cost volume is up-convoluted. In an embodiment of the disclosure, an IMU sensor measurement value 720 is applied as an input to the AI model 700 and the IMU sensor measurement value 720 may be input to the 3D cost volume. There may be an error between the depth map 730 output through the training process and a groundtruth of the disparity according to the similarity between the pixel intensity values of the left-eye image 710L and the right-eye image 710R, and the augmented reality device 100 may train the AI model 700 by using a loss 740 in order to modify the error of the depth map 730.

The augmented reality device 100 obtains information about the gravity direction based on the IMU sensor measurement value 720, and may calculate the loss 740 based on the depth values of pixels on a plane defined by the modified normal vector $N'_{i,j}$ (see FIGS. 6A and 6B) according to the gravity direction or the direction perpendicular to the gravity direction. A detailed examples in which the augmented reality device 100 calculates the loss 740 will be described in detail later with reference to FIGS. 8 to 10.

Figure 8:
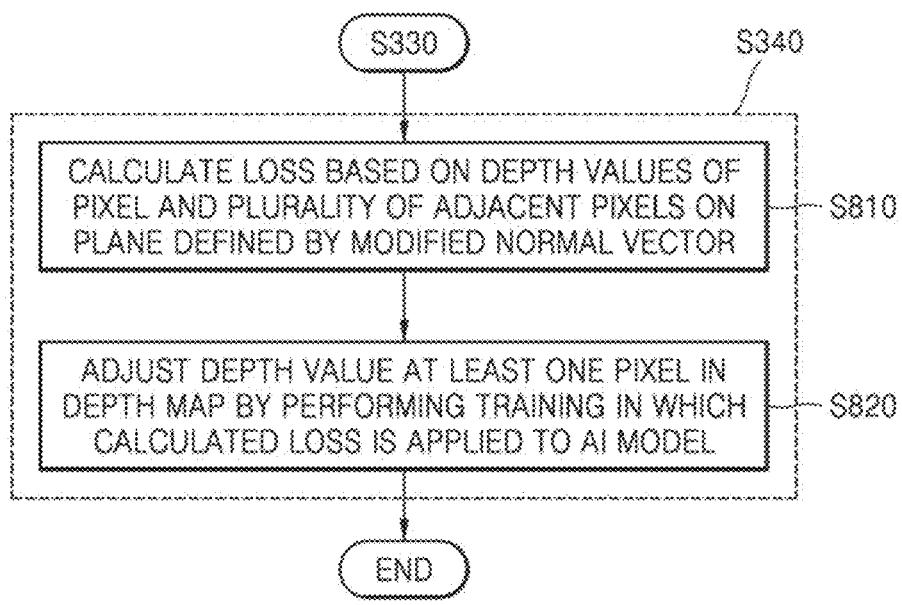
FIG. 8 is a flowchart illustrating a method, performed by an augmented reality device, of adjusting a depth value for each pixel in a depth map, according to an embodiment of the disclosure.

FIG. 8 is a flowchart illustrating a method, performed by the augmented reality device 100, of adjusting a depth value for each pixel in a depth map, according to an embodiment of the disclosure.

Operations S810 and S820 of FIG. 8 are details of operation S340 of FIG. 3. Operation S810 shown in FIG. 8 may be performed after performing operation S330 of FIG. 3.

In operation S810, the augmented reality device 100 may calculates the loss 740 (see FIG. 7) based on the depth values of the pixel and a plurality of adjacent pixels on the plane defined by the modified normal vector $N'_{i,j}$ (see FIGS. 6A and 6B). A detailed example in which the augmented reality device 100 calculates the loss 740 will be described in detail below with reference to FIGS. 9 and 10.

Figure 9:
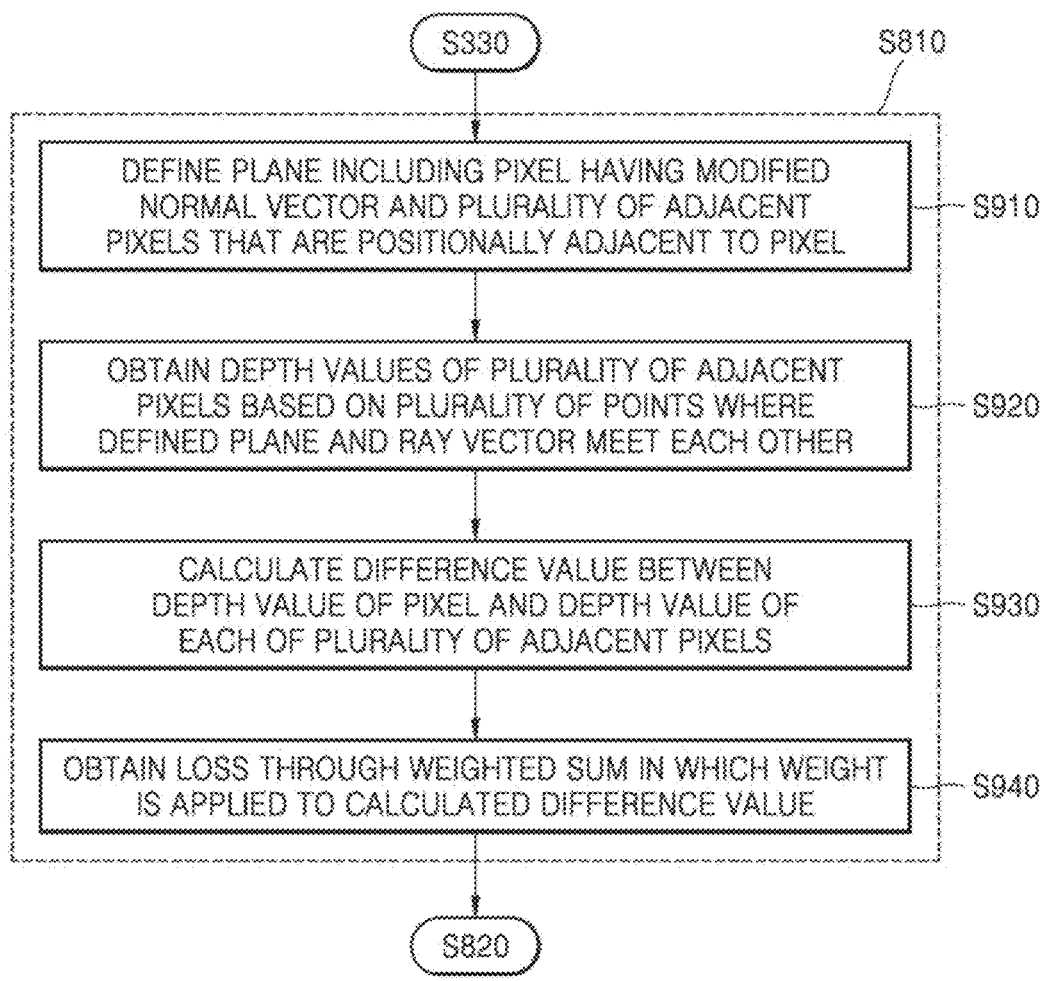
FIG. 9 is a flowchart illustrating a method, performed by an augmented reality device, of calculating a loss according to an embodiment of the disclosure.

FIG. 9 is a flowchart illustrating a method, performed by the augmented reality device 100, of calculating the loss 740 according to an embodiment of the disclosure.

Operations S910 to S940 of FIG. 9 are detailed processes of operation S810 shown in FIG. 8. Operation S820 of FIG. 8 may be performed after performing operation S940 of FIG. 9.

Figure 10:
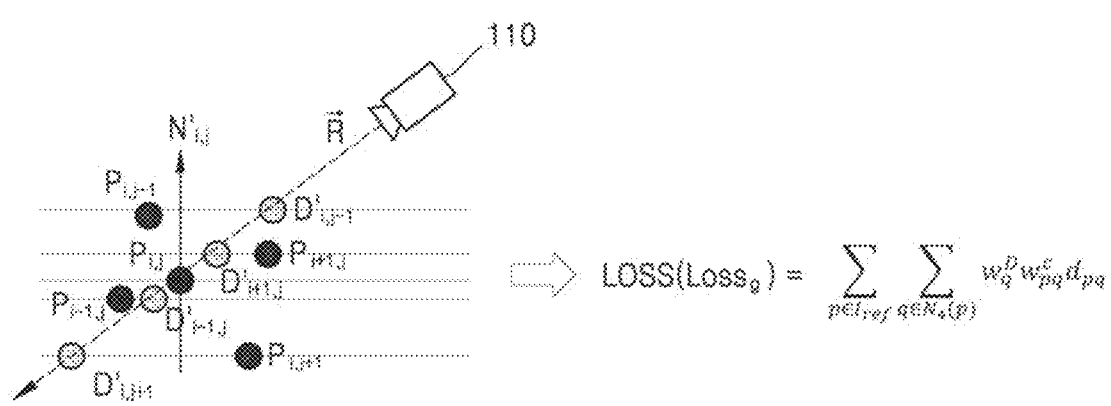
FIG. 10 is a diagram showing an operation, performed by an augmented reality device, of calculating a loss according to an embodiment of the disclosure.

FIG. 10 is a diagram showing an operation of the augmented reality device 100 for calculating the loss 740 according to an embodiment of the disclosure. Hereinafter, operation S810 of FIG. 8 will be described below with reference to FIGS. 9 and 10.

Referring to operation S910 of FIG. 9, the augmented reality device 100 define a plane including a pixel having a modified normal vector and a plurality of adjacent pixels that are positionally adjacent to the above pixel. Referring to FIG. 10 together, the processor 130 (see FIG. 2) of the augmented reality device 100 may define a plane including a 3D coordinate value $P_{i,j}$ of a first pixel having modified normal vector $N'_{i,j}$ and 3D coordinate values $P_{i-1, j}$, $P_{i+1, j}$, $P_{i, j-1}$, $P_{i, j+1}$ of a plurality of adjacent pixels that are adjacent to the first pixel in the upper and lower directions and left and right directions. The 3D coordinate value $P_{i,j}$ of the first pixel and the 3D coordinate values $P_{i-1, j}$, $P_{i+1, j}$, $P_{i, j-1}$, $P_{i, j+1}$ of the plurality of adjacent pixels may have different depth values.

In operation S920 of FIG. 9, the augmented reality device 100 obtains the depth values of the plurality of adjacent pixels based on a plurality of points where the defined plane and a ray vector of the camera meet each other. Referring to FIG. 10, the processor 130 may identify the plurality of points where the plane defined in operation S910 and the ray vector ($\vec{R}$) of the camera 110 meet each other. The ray vector ($\vec{R}$) of the camera 110 may be determined based on the positional relationship including at least one of the distance or the height between the camera 110 and the plane and the direction of the camera 110. The processor 130 may obtain the depth values $D'_{i,j}$, $D'_{i-1, j}$, $D'_{i+1, j}$, $D'_{i, j-1}$, $D'_{i, j+1}$ of the plurality of identified points. In an embodiment of FIG. 10, a first depth value $D'_{i,j}$ may be equal to a depth value of the 3D coordinate value $P_{i,j}$ of the first pixel. A second depth value $D'_{i-1, j}$ may be equal to the depth value of the 3D coordinate value $P_{i-1, j}$ of the second pixel. However, the position of the second point having the second depth value $D'_{i-1, j}$ may be located at different position from the 3D coordinate value $P_{i-, j}$ of the second pixel. Likewise, the third depth value $D'_{i+1, j}$ may be equal to that of the 3D coordinate value $P_{i+1, j}$ of the third pixel, but the position of the third point may be different from the position of the 3D coordinate value $P_{i+i, j}$ of the third pixel.

In operation S930 of FIG. 9, the augmented reality device 100 respectively calculate differences between the depth value of the pixel and the depth values of the plurality of adjacent pixels. Referring to FIG. 10 together, the processor 130 may respectively calculate difference value $d_{pq}$ between the depth value $D'_{i,j}$ of the first pixel and the depth values $D'_{i-1, j}$, $D'_{i+1, j}$, $D'_{i, j-1}$, $D'_{i, j+1}$ of the plurality of adjacent pixels based on equation 3 below.

$$d_{pq}=D'_p-D'_q \qquad \text{[Equation 3]}$$

In equation 3 above, $D'_p$ denotes the depth value $D'_{i,j}$ of the first pixel that is the reference pixel having modified normal vector $N'_{i,j}$ and $D'_q$ denotes the depth value $D'_{i-1, j}$, $D'_{i+1, j}$, $D'_{i, j-1}$, $D'_{i, j+1}$ of each of the plurality of adjacent pixels that are positionally adjacent to the first pixel. According to equation 3 above, the processor 130 may obtain $d_{pq}$ by respectively calculating $D'_{i,j} - D'_{i-1, j}$, $D'_{i,j} - D'_{i+1, j}$, $D'_{i,j} - D'_{i, j-1}$, and $D'_{i,j} - D'_{i, j+1}$.

In operation S940 of FIG. 9, the augmented reality device 100 obtains the loss through the weighted sum operation, in which a weight is applied to the calculated difference value. Referring to FIG. 10, the processor 130 may obtain the loss $Loss_g$ through the weighted sum operation in which a first weight $w_q^D$ and a second weight $w_{pq}^C$ to the calculated difference value $d_{pq}$. In an embodiment of the disclosure, the loss $Loss_g$ may be calculated by equation 4 below.

$$\sum_{p \in I_{ref}} \sum_{q \in N_4(p)} w_q^D w_{pq}^c d_{pq} \qquad \text{[Equation 4]}$$

In equation 4 above, the first weight $w_q^D$ may be determined based on the distance between the plurality of adjacent pixels and the position of the camera 110 in the depth map 730 (see FIG. 7). In an embodiment of the disclosure, the first weight $w_q^D$ may be calculated based on the depth values $D_{i-1, j}$, $D_{i+1, j}$, $D_{i, j-1}$, $D_{i, j+1}$ of the plurality of adjacent pixels in the depth map 730, as expressed by equation 5 below.

$$w_q^D = \frac{1}{N_D} \exp\left(-\frac{D_q}{\gamma_D}\right) \qquad \text{[Equation 5]}$$

Referring to equation 5 above, $D_q$ denotes the depth values $D_{i-1, j}$, $D_{i+1, j}$, $D_{i, j-1}$, $D_{i, j+1}$ of the plurality of adjacent pixels in the depth map 730, and as the depth values $D_{i-1, j}$, $D_{i+1, j}$, $D_{i, j-1}$, $D_{i, j+1}$ of the plurality of adjacent pixels decrease, the first weight $w_q^D$ increases. As the distance between the depth values $D_{i-1, j}$, $D_{i+1, j}$, $D_{i, j-1}$, $D_{i, j+1}$ of the plurality of adjacent pixels, that is, the adjacent pixels and the camera 110 is reduced, the value of the first weight $w_q^D$ may increase. Because the accuracy of the depth value degrades as the distance increases in the method of extracting the depth map 730 using the stereo camera, equation 5 above is designed to apply the weight more to the pixels close to the camera 110.

In equation 4 above, the second weight $w_{pq}^C$ may be determined based on the difference between pixel intensity values between the first pixel and the plurality of adjacent pixels in the depth map 730. In an embodiment of the disclosure, the second weight $w_{pq}^C$ may be calculated based on the difference in the intensity value between the pixels in the depth map 730 as expressed by equation 6 below.

$$w_{pq}^c = \frac{1}{N_c} \exp\left(-\frac{|I_p - I_q|}{\gamma_c}\right) \qquad \text{[Equation 6]}$$

Referring to FIG. 6, $I_p$ denotes a intensity value of the first pixel in the depth map 730 and Ig denotes intensity values of the plurality of adjacent pixels. As the difference value between the intensity value of the first pixel and each of the intensity values of the plurality of adjacent pixels is reduced, the value of the second weight $w_{pq}^C$ increases. When intensity values of the pixels on the depth map 730 are similar, the possibility of having the same or similar depth values increases. Thus, equation 6 above is designed to apply the weight more to the difference in the intensity values of the pixels in the depth map 730.

Referring back to FIG. 8, in operation S820, the augmented reality device 100 may perform the training of applying the calculated loss $Loss_g$ (see FIG. 10) to the AI model, and thus, the depth value of at least one pixel in the depth map is adjusted.

In an embodiment of FIGS. 8 to 10, the loss $Loss_g$ may be determined based on the depth values $D'_{i,j}$, $D'_{i-1, j}$, $D'_{i+1, j}$, $D'_{i, j-1}$, $D'_{i, j+1}$ due to the plane defined by the modified normal vector $N'_{i,j}$ (see FIGS. 6A and 6B) and the ray vector ($\vec{R}$) of the camera 110. In particular, the loss $Loss_g$ is calculated by applying the first weight $w_q^D$ determined based on the distance from the camera 110 and the second weight $w_{pq}^C$ determined based on the difference in the intensity value between pixels in the depth map, and thus, the accuracy of the depth value may be improved through the training of applying the loss $Loss_g$ to the AI model.

Figure 11:
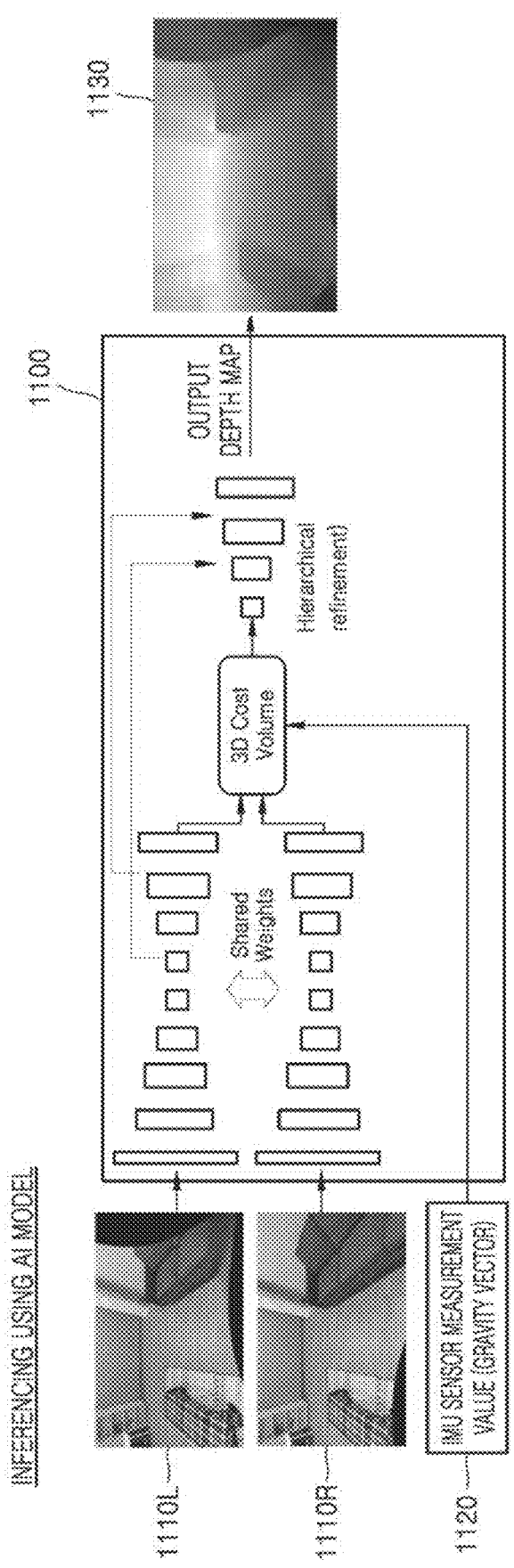
FIG. 11 is a diagram showing an operation, performed by an augmented reality device, of obtaining a depth map by using an artificial intelligence model according to an embodiment of the disclosure.

FIG. 11 is a diagram for illustrating an operation in which the augmented reality device 100 according to an embodiment of the disclosure obtains a depth map 1130 by using an AI model 1100.

Referring to FIG. 11, the augmented reality device 100 may include a stereo camera including a left-eye camera and a right-eye camera. The augmented reality device 100 may obtain the depth map 1130 by inputting a left-eye image 1110L obtained by using the left-eye camera and a right image 1110R obtained by using the right-eye camera, and an IMU sensor measurement value 1120 to the AI model 1100, and performing inference using the AI model 1100.

The AI model 1100 may be trained by applying the loss 740 (see FIG. 7) as shown in an embodiment of FIG. 7. The augmented reality device 100 may input the IMU sensor measurement value 1120 measured by the IMU sensor 120 (see FIG. 2) to the AI model 1100 and the input IMU sensor measurement value 1120 may be applied to the 3D cost volume. During the inference of the AI model 1100, the depth map 1130 may be output through the hierarchical refinement such as the up-convolution of the 3D cost volume, etc.

In an embodiment shown in FIG. 11, the augmented reality device 100 obtains the depth map 1130 by using the AI model 1100 that is trained by using the IMU sensor measurement value 1120 including information about the gravity direction, and thus, the accuracy of the depth values in the depth map 1130 may be improved. Also, the augmented reality device 100 according to an embodiment of the disclosure trains the AI model 1100 by using the IMU sensor measurement value 1120 that is obtained from the IMU sensor 120 that is an essential element, and thus, an additional hardware module is not necessary. Thus, a technical effect of implementing lower power consumption while maintaining a compact-sized form factor may be provided.

Figure 12:
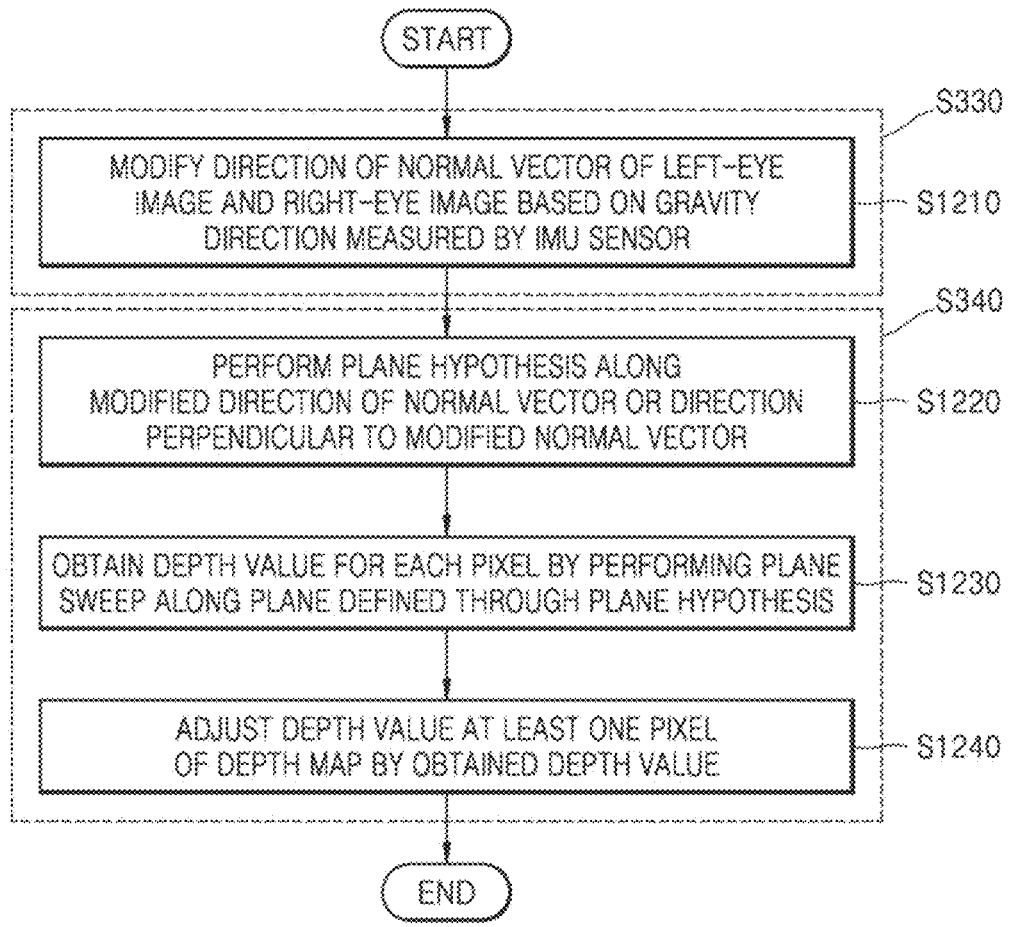
FIG. 12 is a flowchart illustrating a method, performed by an augmented reality device, of adjusting a depth value for each pixel in a depth map according to an embodiment of the disclosure.

FIG. 12 is a flowchart illustrating a method, performed by the augmented reality device 100, of adjusting a depth value for each pixel in a depth map, according to an embodiment of the disclosure.

Operation S1210 of FIG. 12 is included in operation S330 of FIG. 3. Operations S1220 to S1240 shown in FIG. 12 are detailed processes of operation S340 of FIG. 3.

Figure 13:
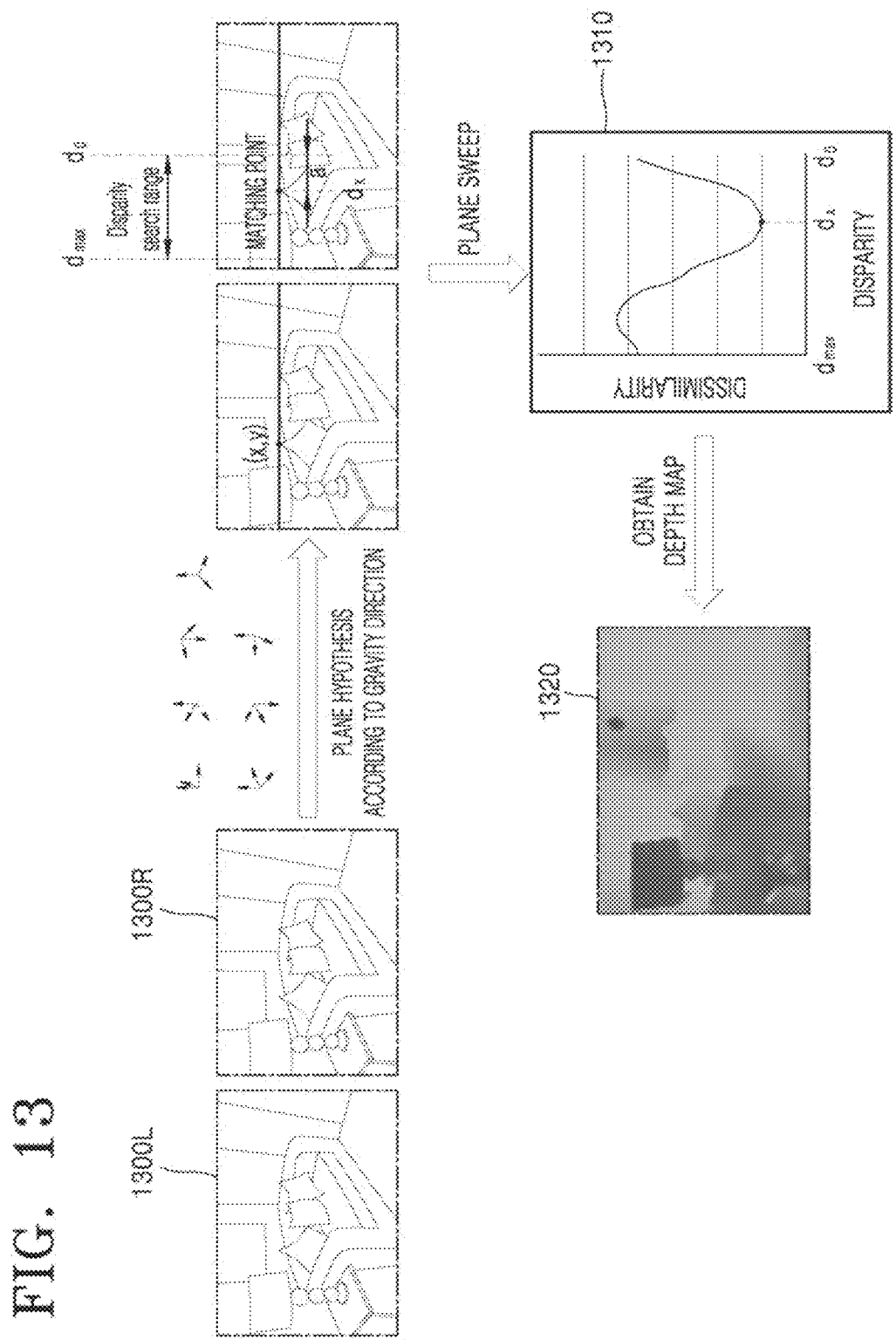
FIG. 13 is a diagram illustrating an operation, performed by an augmented reality device, of adjusting a depth value per pixel in a depth map through a plane sweep method according to an embodiment of the disclosure.

FIG. 13 is a diagram illustrating an operation, performed by the augmented reality device 100 according to an embodiment of the disclosure, of adjusting a depth value per pixel in a depth map 1320 through a plane sweep method. Hereinafter, an operation in which the augmented reality device 100 adjusts the depth value for each pixel in the depth map 1320 will be described below with reference to FIGS. 12 and 13.

Referring to FIG. 12, the augmented reality device 100 may modify the direction of the normal vector in the left-eye image and the right-image image based on the gravity direction measured by the IMU sensor 120 (see FIG. 2) in operation S1210. Referring to FIG. 13, the augmented reality device 100 may include a stereo camera including a left-eye camera and a right-eye camera. The processor 130 (see FIG. 2) of the augmented reality device 100 may obtain gravity direction information from the gyroscope of the IMU sensor 120 (see FIG. 2), and may modify the direction of normal vector for each pixel in a left-eye image 1300L obtained by using the left-eye camera and a right-eye image 1300R obtained by using the right-eye camera based on the obtained gravity direction information. In an embodiment of the disclosure, the processor 130 may modify the direction of the normal vector for each pixel in the gravity direction and the direction perpendicular to the gravity direction. A detailed method of modifying the direction of the normal vector is the same as that described above with reference to FIGS. 6A and 6B, and thus, descriptions thereof are omitted.

Referring to FIG. 12, in operation S1220, the augmented reality device 100 performs plane hypothesis along the modified direction of the normal vector or the direction perpendicular to the modified direction of the normal vector. Referring to FIG. 13 together, the processor 130 may define a plane for each pixel through the plane hypothesis with respect to each of the left-eye image 1300L and the right-eye image 1300R. The processor 130 may define the plane for each pixel in the left-eye image 1300L, by performing the plane hypothesis along the modified direction of the normal vector of each pixel or a direction perpendicular to the modified direction of the normal vector of each pixel included in the left-eye image 1300L. In the same manner, the processor 130 may define the plane for each pixel in the right-eye image 1300R, by performing the plane hypothesis along the modified direction of the normal vector of each pixel or a direction perpendicular to the modified direction of the normal vector of each pixel included in the right-eye image 1300R.

Referring to FIG. 12, the augmented reality device 100 obtains the depth value for each pixel by performing the plane sweep along the plane defined through the plane hypothesis in operation S1230. Referring to FIG. 13, the processor 130 may perform the plane sweep in which a matching point in the right-eye image 1300R is searched for based on a two-dimensional position coordinate value (x, y) of a reference pixel on the plane defined in the left-eye image 1300L. In an embodiment of the disclosure, the processor 130 may identify a plane of the right-eye image 1300R, which corresponds to the plane defined in the left-eye image 1300L, through the plane hypothesis, and search for the matching point in the plane identified in the right-eye image 1300R. In an embodiment of the disclosure, the processor 130 may search for a matching point corresponding to the reference pixel of the left-eye image 1300L, within a disparity search range of $d_0$ to $d_{max}$ from among the pixels in the plane defined in the right-eye image 1300R. The processor 130 measures the intensity value similarity between the reference pixel in the plane of the left-eye image 1300L and pixels in the corresponding plane of the right-eye image 1300R, and may identify a pixel as the matching point, the pixel having the lowest intensity value dissimilarity in the right-eye image 1300R based on a graph 1310 indicating relationship between the intensity value dissimilarity and the disparity between pixels. The processor 130 may determine a distance $d_x$ between the position of the reference pixel in the left-eye image 1300L and the pixel identified as the matching point in the right-eye image 1300R, as the disparity. The processor 130 may obtain the depth value for each pixel by performing the plane sweep with respect to every pixel in the left-eye image 1300L and the right-eye image 1300R in the above-described manner.

Referring to FIG. 12, in operation S1240, the augmented reality device 100 adjusts the depth value of at least one pixel in the depth map by using the obtained depth value. Referring to FIG. 13, the processor 130 of the augmented reality device 100 may adjust the depth value of the depth map 1320 by using the obtained depth value for each pixel.

In an embodiment of FIGS. 12 and 13, the augmented reality device 100 may obtain the depth map 1320 having high accuracy, by modifying the normal vector of each pixel in the gravity direction and performing the plane sweep on the plane defined according to the modified normal vector.

Figure 14:
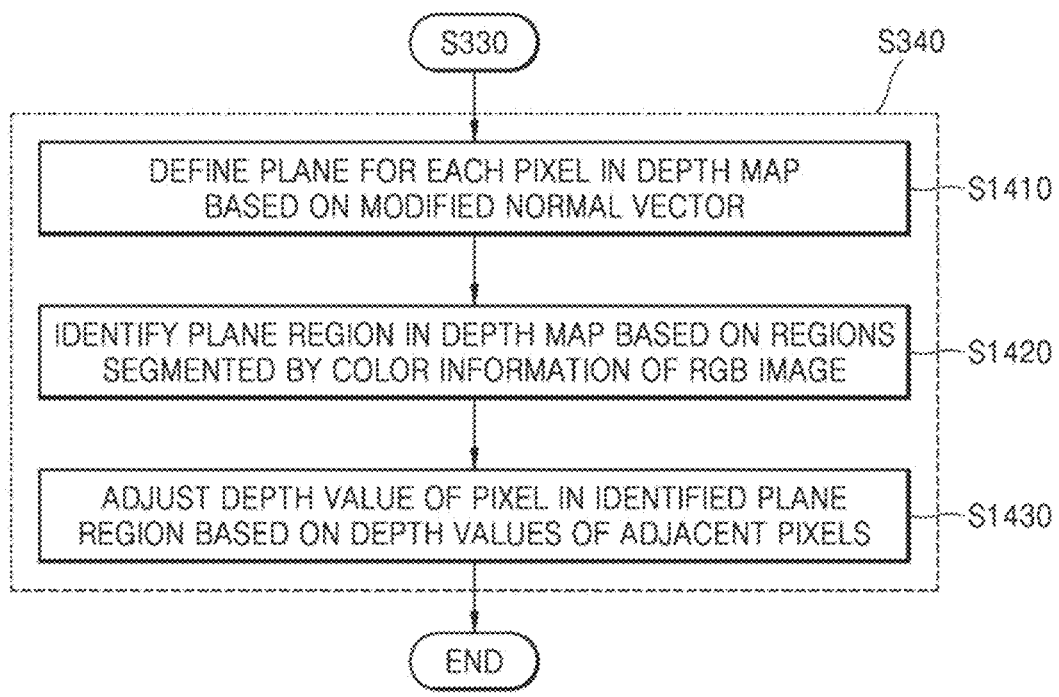
FIG. 14 is a flowchart illustrating a method, performed by an augmented reality device, of adjusting a depth value for each pixel in a depth map, according to an embodiment of the disclosure.

FIG. 14 is a flowchart illustrating a method of adjusting a depth value for each pixel in a depth map, by the augmented reality device 100 according to an embodiment of the disclosure.

Operations S1410 to S1430 shown in FIG. 14 are details of operation S340 of FIG. 3. Operation S1410 shown in FIG. 14 may be performed after performing operation S330 of FIG. 3.

Figure 15:
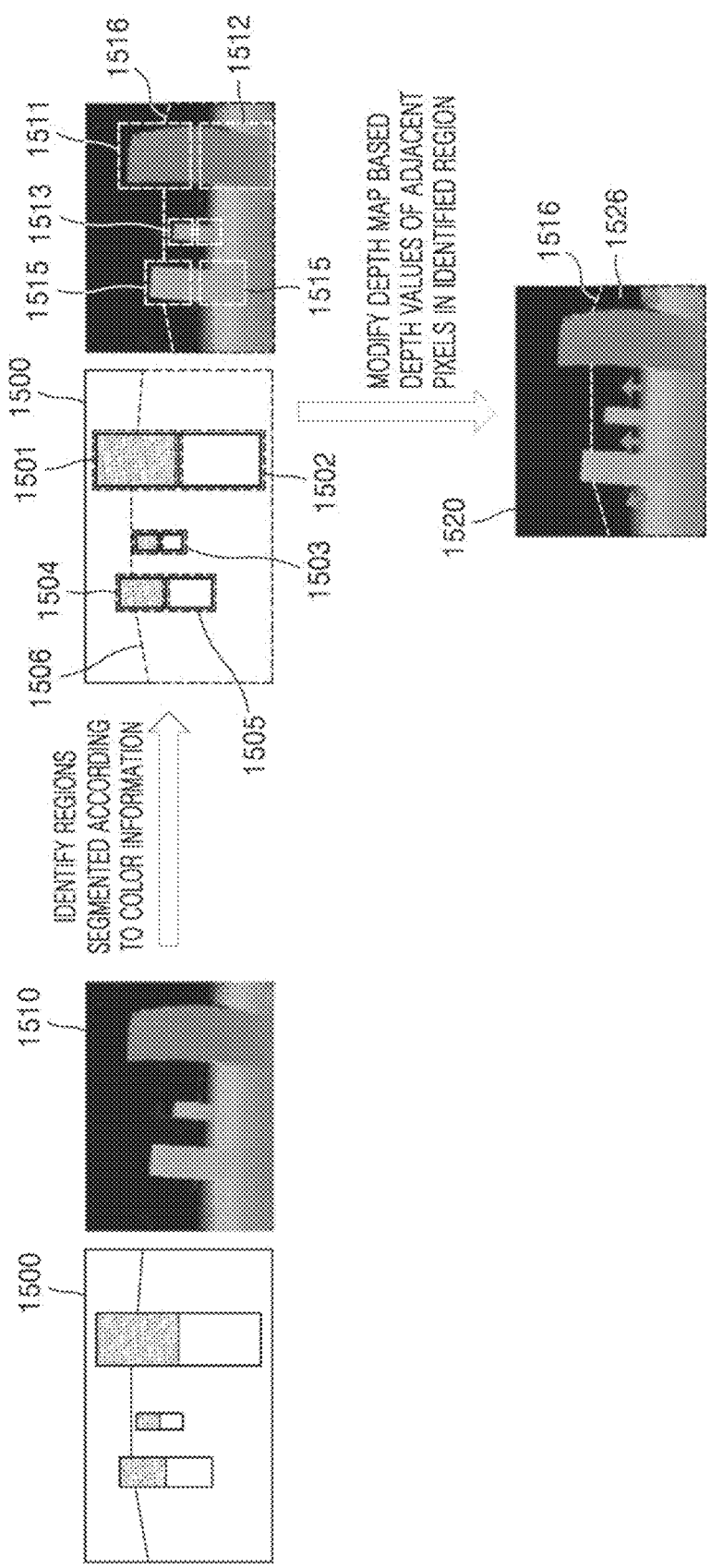
FIG. 15 is a diagram illustrating an operation, performed by an augmented reality device, of adjusting a depth value per pixel in a depth map obtained by a time-of-flight (ToF) method according to an embodiment of the disclosure.

FIG. 15 is a diagram illustrating an operation, performed by the augmented reality device 100 according to an embodiment of the disclosure, of adjusting a depth value per pixel in a depth map image 1510 obtained by a time-of-flight (ToF) method.

Referring to FIG. 14, in operation S1410, the augmented reality device 100 defines the plane for each pixel in the depth map based on the modified normal vector. In an embodiment of the disclosure, the augmented reality device 100 may include a ToF camera. The ToF camera irradiates light by using a light source, detects reflected light that is reflected from an object, and obtains a depth value of the object based on the ToF that is a time difference between the time point when the reflected light is detected and a time point when the light is irradiated. Referring to FIG. 15, the augmented reality device 100 may obtain an RGB image 1500 and a depth map image 1510 of the object by using the ToF camera. The processor 130 (see FIG. 2) of the augmented reality device 100 may obtain the normal vector for each pixel from the depth map image 1510, and may modify the direction of the normal vector along the gravity direction or the direction perpendicular to the gravity direction. The processor 130 may define the plane for each pixel in the depth map image 1510 based on the modified direction of the normal vector. In an embodiment of the disclosure, the processor 130 may define a plane including the pixel having the modified normal vector and a plurality of adjacent pixels that are positionally adjacent to the pixel.

Referring to FIG. 14, in operation S1420, the augmented reality device 100 identifies the place area in the depth map based on regions segmented by the color information of the RGB image. Referring to FIG. 15, the processor 130 of the augmented reality device 100 may segment the RGB image 1500 into a plurality of regions 1501 to 1506 based on the color information of each of the plurality of pixels included in the RGB image 1500. In an embodiment of the disclosure, the processor 130 may segment the RGB image 1500 into the plurality of regions 1501 to 1506 based on an intensity value of each of the plurality of pixels in the RGB image 1500. The processor 130 may segment the RGB image 1500 into the plurality of regions 1501 to 1506 by calculating a difference value in the intensity value of each of the plurality of pixels of the RGB image 1500 and grouping the pixels having the calculated difference values equal to or less than a critical value. The processor 130 may identify the plane area in the depth map image 1510 based on at least one piece of information from among positions, shapes, and sizes of the plurality of segmented regions 1501 to 1506 of the RGB image 1500. In an embodiment of FIG. 15, the processor 130 may identify a plurality of plane regions 1511 to 1516 corresponding to the plurality of segmented regions 1501 to 1506 in the RGB image 1500, from the depth map image 1510.

Referring to FIG. 14, in operation S1430, the augmented reality device 100 may adjust a depth value of a pixel in the identified plane region, based on the depth values of adjacent pixels. In an embodiment of the disclosure, the augmented reality device 100 may identify the pixel to be modified in the plane region of the depth map and may adjust the depth value of the identified pixel to be adjusted based on the depth values of the adjacent pixels in the same plane region. In the specification, the 'pixel to be adjusted' denotes a pixel of which the depth value needs to be adjusted, and a pixel of which the depth value is not obtained in the plane area or a pixel of which the difference from the depth values of the adjacent pixels in the plane area exceeds a preset critical value. In an embodiment of FIG. 15, in the first to fifth plane regions 1511 to 1515 from among the plurality of plane regions 1511 to 1516 identified from the depth map image 1510, the pixel of which the depth value is not obtained and the pixels having the depth value differences that are equal to or greater than the preset critical value may not be identified. In the sixth plane region 1516 from among the plurality of plane regions 1511 to 1516, at least one pixel to be adjusted 1526, of which a depth value is not obtained, may be identified. The processor 130 may adjust the depth value of the identified pixel to be adjusted 1526 based on the depth values of the adjacent pixels from among the plurality of pixels included in the sixth plane region 1516.

In the case of a general ToF camera, the accuracy of the depth value may decrease or the depth value may not be obtained away from the camera. In an embodiment of FIGS. 14 and 15, the augmented reality device 100 modifies the normal vector for each pixel based on the gravity direction in the depth map image 1510, defines a plane based on the modified normal vector, identifies the plane regions of the depth map image 1510 based on the color information for each pixel of the RGB image, and adjusts the depth value of the pixel to be adjusted 1526 in the plane region in depth map image 1520. Thus, the accuracy of the depth map may be improved.

Figure 16:
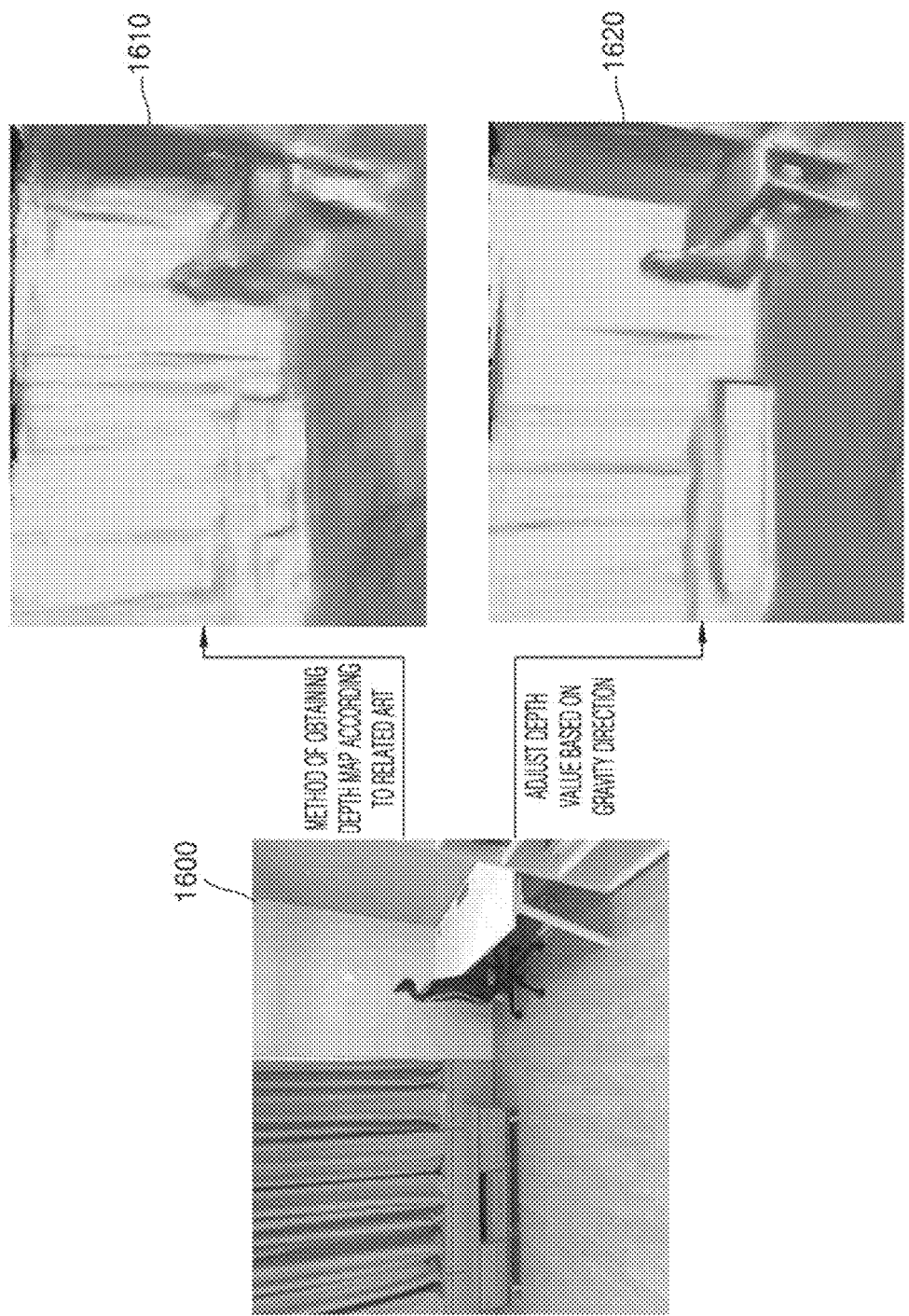
FIG. 16 is a diagram showing a space model reconstructed by a depth map obtained by a general method and a space model reconstructed by a depth map obtained by an augmented reality device according to an embodiment of the disclosure.

FIG. 16 is a diagram showing a 3D space model 1610 reconstructed by a depth map obtained in a conventional way, and a 3D space model 1620 reconstructed by the depth map obtained by the augmented reality device 100 according to an embodiment of the disclosure.

Referring to FIG. 16, according to the 3D space model 1610 of a real world space 1600 obtained through a conventional depth map acquisition method of the related art, the surface of the object is inclined and the accuracy of the 3D space model 1610 is low. In a conventional depth map acquisition method, the accuracy of the depth value degrades away from the camera.

The augmented reality device 100 according to an embodiment of the disclosure modifies the direction of the normal vector for each pixel along the gravity direction measured by the IMU sensor 120 (see FIG. 2) and the direction perpendicular to the gravity direction, and adjusts the depth value for each pixel based on the modified normal vector. Thus, the accuracy of the obtained depth map and resolution may be improved as compared with the depth map obtained in a conventional method. Also, in the 3D space model 1620 reconstructed by the depth map obtained by the augmented reality device 100 according to an embodiment of the disclosure, it is identified that the direction of the object is modified to the direction perpendicular to or parallel to the gravity direction.

Also, the augmented reality device 100 according to an embodiment of the disclosure obtains the gravity direction information by using the IMU sensor 120 that is an essential element, and thereby implementing low power consumption while maintaining the compact-sized form factor. As such, the augmented reality device 100 of the disclosure may provide the technical effects of increasing the portability and device usage duration, and improving user convenience.

The disclosure provides the augmented reality device 100 that adjusts the depth value based on the gravity direction. The augmented reality device 100 according to an embodiment of the disclosure may include the camera 110 (see FIG. 2), the IMU sensor 120 (see FIG. 2), at least one processor 130 (see FIG. 2), and the memory 140 (see FIG. 2). The at least one processor 130 may obtain a depth map from an image obtained by using the camera 110, by executing at least one instructions stored in the memory 140. The at least one processor 130 may obtain a normal vector of at least one pixel included in the depth map. The at least one processor 130 may modify the direction of the normal vector of the at least one pixel based on the gravity direction measured by the IMU sensor 120. The at least one processor 130 may adjust the depth value of the at least one pixel based on the modified direction of the normal vector.

In an embodiment of the disclosure, the at least one processor 130 may obtain the normal vector by converting the at least one pixel into a 3D coordinate value based on the normal vector of at least one pixel included in the depth map and the depth value of the at least one pixel, and calculating the cross-product of the 3D coordinate values of the plurality of adjacent pixels that are adjacent in per and lower, and left and right directions.

In an embodiment of the disclosure, the camera 110 may include a left-eye camera including a left-eye image and a right-eye camera including the right-eye image. The at least one processor 130 may obtain the depth map by applying the left-eye image and the right-eye image as inputs to the AI model and calculating the disparity according to the similarity between the intensity values of the pixels in the left-eye image and the right-eye image by using the AI model.

In an embodiment of the disclosure, the at least one processor 130 may calculate the loss of the depth map obtained by the AI model, based on the depth values of the pixel on the plane defined by the modified normal vector and the plurality of adjacent pixels that are positionally adjacent to the pixel. The at least one processor 130 may adjust the depth value of the at least one pixel by performing the training in which the calculated loss is applied to the AI model.

In an embodiment of the disclosure, the at least one processor 130 may define the plane including a pixel having the modified normal vector and the plurality of adjacent pixels that are positionally adjacent to the pixel, and obtain the depth values of the plurality of adjacent pixels based on a plurality of points where the defined plane and the ray vector of the camera 110 meet each other. The at least one processor 130 may respectively calculate a difference value between the obtained depth value of the pixel and the depth values of the plurality of adjacent pixels. The at least one processor 130 may obtain the loss by performing a weighted sum in which a weight is applied to the difference value calculated for each of the plurality of adjacent pixels.

In an embodiment of the disclosure, the weight may include a first weight that is determined based on a distance between each of the plurality of adjacent pixels in the depth map and the camera, and a second weight that is determined based on a difference of intensity value between the pixel and the plurality of adjacent pixels in the depth map.

In an embodiment of the disclosure, at least one processor 130 may obtain a adjusted depth map by performing inference in which the left-eye image and the right-eye image are input to the trained AI model.

In an embodiment of the disclosure, the at least one processor 130 may include the left-eye camera obtaining the left-eye image and the right-eye camera obtaining the right-eye image. The at least one processor 130 may modify the direction of the normal vector of at least one pixel in the left-eye image and the right-eye image according to the gravity direction or the direction perpendicular to the gravity direction, and perform the plane hypothesis according to the modified direction of the normal vector or the direction perpendicular to the modified direction of the normal vector. The at least one processor 130 may obtain the depth value of at least one pixel by performing the plane sweep along the plane defined through the plane hypothesis. The at least one processor 130 may adjust the depth value of at least one pixel in the depth map by using the obtained depth value.

In an embodiment of the disclosure, the camera 110 may include the ToF camera, and the at least one processor 130 may obtain the depth map by using the ToF camera.

In an embodiment of the disclosure, the at least one processor 130 may define the plane for each pixel based on the modified normal vector. The at least one processor 130 may identify the plane regions of the plane defined in the depth map based on the regions segmented according to the color information of the RGB image. The at least one processor 130 may adjust the depth value of the at least one pixel in the depth map based on the depth values of the adjacent pixels in the identified plane regions.

The disclosure provides a method of, by the augmented reality device 100, adjusting the depth value. In an embodiment of the disclosure, the method may include a process of obtaining the depth map from an image obtained by using the camera 110 (S310). The method may include a process of obtaining the normal vector of at least one pixel included in the depth map (S320). The method may include a process of modifying the direction of the normal vector of at least one pixel based on the gravity direction measured by the IMU sensor 120 (S330). The method may include a process of adjusting the depth value of the at least one pixel based on the modified direction of the normal vector (S340).

In an embodiment of the disclosure, the process of obtaining the depth map (S310) may include a process of inputting the left-eye image obtained by using the left-eye camera and the right-eye image obtained by using the right-eye camera into the AI model, and a process of obtaining the depth map by calculating the disparity according to the similarity in the intensity values between the pixels of the left-eye image and the right-eye image by using the AI model.

In an embodiment of the disclosure, the operation of adjusting the depth values of at least one pixel (S340) may include a process of calculating the loss of the depth map obtained by the AI model, based on the depth values of the pixel on the plane defined by the modified normal vector and the plurality of adjacent pixels that are positionally adjacent to the pixel (S810). The operation of adjusting the depth value of at least one pixel (S340) may include a process of adjusting the depth value of the at least one pixel in the depth map by performing a training, in which the calculated loss is applied to the AI model (S820).

In an embodiment of the disclosure, the operation of calculating the loss (S810) may include a process of defining the plane including the pixel having the modified normal vector and the plurality of adjacent pixels that are positionally adjacent to the pixel (S910), and an operation of obtaining the depth values of the plurality of adjacent pixels based on the plurality of points where the defined plane and the ray vector of the camera 110 meet each other (S920). The operation of calculating the loss (S810) may include a process of respectively calculating a difference value between the depth value of the obtained pixel and the depth values of the plurality of adjacent pixels (S930). The operation of calculating the loss (S810) may include a process of obtaining the loss by performing the weighted sum in which the weight is applied to the difference value calculated for each of the plurality of adjacent pixels (S940).

In an embodiment of the disclosure, the weight may include a first weight that is determined based on a distance between each of the plurality of adjacent pixels in the depth map and the camera 110, and a second weight that is determined based on a difference of intensity value between the pixel and the plurality of adjacent pixels in the depth map.

In an embodiment of the disclosure, the method may further include a process of obtaining the adjusted depth map by performing inference in which the left-eye image and the right-eye image are input to the trained AI model.

In an embodiment of the disclosure, the process of modifying the direction of the normal vector of the at least one pixel (S330) may include a process of modifying the direction of the normal vector of the left-eye image obtained by using the left-eye camera and the right-eye image obtained by using the right-eye camera, according to the gravity direction or the direction perpendicular to the gravity direction. The process of adjusting the depth value of the at least one pixel (S340) may include a process of performing the plane hypothesis along the modified direction of the normal vector and the direction perpendicular to the modified direction of the normal vector (S1220). The process of adjusting the depth value of the at least one pixel (S340) may include a process of obtaining the depth value of the at least one pixel by performing the plane sweep along the plane defined through the plane hypothesis. The process of adjusting the depth value of the at least one pixel (S340) may include a process of adjusting the depth value of at least one pixel by using the obtained depth value (S1240).

In an embodiment of the disclosure, the process of obtaining the depth map (S310) may obtain the depth map by using the ToF camera.

In an embodiment of the disclosure, the process of adjusting the depth value of the at least one pixel (S340) may include a process of defining a plane of the pixel based on the modified normal vector (S1410). The process of adjusting the depth value of the at least one pixel (S340) may include a process of identifying the plane regions of the plane defined in the depth map based on the regions segmented according to the color information of the RGB image (S1420). The process of adjusting the depth of the at least one pixel (S340) may include a process of adjusting the depth value of the at least one pixel based on the depth values of the adjacent pixels in the identified plane regions (S1430).

The disclosure provides a computer program product including a computer-readable storage medium. The storage medium may store instructions regarding the operation of obtaining the depth map from the image that is obtained by using the camera 110. The storage medium may store instructions regarding the operation of obtaining the normal vector of the at least one pixel included in the depth map. The storage medium may store instructions related to an operation of modifying the direction of the normal vector of the at least one pixel based on the gravity direction measured by the IMU sensor. The storage medium may store instructions related to the operation of adjusting the depth value of at least one pixel in the depth map based on the modified direction of the normal vector.

The program executed by the augmented reality device 100 described in the disclosure may be implemented using hardware components, software components, and/or combination of the hardware components and the software components. The program may be executed by all systems capable of executing computer-readable instructions.

The software may include a computer program, a code, an instruction, or a combination of one or more thereof, for independently or collectively instructing or configuring the processing device to operate as desired.

The software may be implemented as computer programs including instructions stored in a computer-readable storage medium. Examples of the computer-readable recording medium include magnetic storage media (e.g., ROM, RAM, floppy disks, hard disks, etc.), and optical recording media (e.g., CD-ROMs or Digital Versatile Discs (DVDs)). The computer-readable recording medium may also be distributed over network coupled computer systems so that the computer-readable code is stored and executed in a distributive manner. This media may be read by the computer, stored in the memory, and executed by the processor.

The computer-readable storage medium may be provided in the form of a non-transitory storage medium. Here, the term 'non-transitory' simply denotes that the storage medium is a tangible device, and does not include a signal, but this term does not differentiate between where data is semi-permanently stored in the storage medium and where the data is temporarily stored in the storage medium. For example, the 'non-transitory storage medium' may include a buffer in which data is temporarily stored.

Also, the program according to an embodiment of the disclosure may be provided to be included in a computer program product. The computer program product may be traded between a seller and a buyer as a product.

The computer program product may include a software program, or a computer-readable storage medium on which the software program is stored. For example, the computer program product may include a product in the form of a software program (e.g., downloadable application) that is electronically distributed by the manufacturer of the augmented reality device 100 or by an electronic market (e.g., Samsung Galaxy Store®). For electronic distribution, at least a part of a software program may be stored in a storage medium or temporarily generated. In this case, the storage medium may include a server of a manufacturer of the augmented reality device 100, a server of an electronic market, or a storage medium of a relay server that temporarily stores a software program.

The computer program product may include a storage medium of a server or a storage medium or the augmented reality device 100, in a system consisting of the augmented reality device 100 and/or the server. Alternatively, when there is a third device (e.g., mobile device) communicating with the augmented reality device 100, the computer program product may include a storage medium of the third device. Alternatively, the computer program product may include a software program itself that is transferred from the augmented reality device 100 to the third device or from the third device to the electronic device.

In this case, one of the augmented reality device 100 and the third device may execute the computer program product to perform the method according to embodiments of the disclosure. Alternatively, at least one or more of the augmented reality device 100 and the third device may execute the computer program product to implement the method according to embodiments of the disclosure in a distributed manner.

For example, the augmented reality device 100 may control another electronic device (e.g., mobile device) communicating with the augmented reality device 100 to perform the method according to an embodiment of the disclosure, by executing the computer program product stored in the memory 140 (see FIG. 2).

In another example, the third device may execute the computer program product and may control the electronic device communicating with the third device to execute the method according to embodiments of the disclosure.

When the third device execute the computer program product, the third device downloads the computer program product from the augmented reality device 100 and executes the computer program product. Alternatively, the third device may execute the computer program product provided in a preloaded state to perform the method according to embodiments of the disclosure.

While the present disclosure has been described with reference to example embodiments, one of ordinary skill in the art may practice various changes and modifications without departing from the spirit and scope of the present disclosure set forth throughout the annexed claim matters. For example, there may be achieved a desired result according to the disclosure even though the techniques are carried out through other methods and procedures different from the aforementioned, and/or even though components such as the computer system or modules are coupled in other manners different from the aforementioned, or substituted or replaced with other components or equivalents.

What is claimed is:

1. An augmented reality device comprising:
at least one camera;
an inertial measurement unit (IMU) sensor configured to measure a gravity direction;
a memory storing at least one instruction; and
at least one processor configured to execute the at least one instruction to:
obtain a left-eye image and a right-eye image by using the at least one camera,
obtain a depth map by calculating a disparity between the left-eye image and the right-eye image by applying the left-eye image and the right-eye image as inputs to an artificial intelligence (AI) model,
obtain a normal vector of at least one pixel included in the depth map,
modify a direction of the normal vector of the at least one pixel, based on the gravity direction measured by the IMU sensor,
obtain a loss of the depth map obtained by the AI model, based on depth values of a first pixel on a plane defined by the normal vector with the modified direction and a plurality of pixels that are adjacent to the first pixel, and
adjust a depth value of the at least one pixel, through the AI model trained by applying the obtained loss.

2. The augmented reality device of claim 1, wherein the at least one processor is further configured to execute the at least one instruction to:
convert the at least one pixel into a three-dimensional (3D) coordinate value, based on a direction vector of the at least one pixel included in the depth map and the depth value of the at least one pixel, and
obtain the normal vector by obtaining a cross-product of the 3D coordinate value of the plurality of pixels that are adjacent to the at least one pixel in at least one of an upper direction, a lower direction, a left direction, and a right direction.

3. The augmented reality device of claim 2, wherein the at least one camera comprises a left-eye camera configured to obtain the left-eye image and a right-eye camera configured to obtain the right-eye image, and
wherein the at least one processor is further configured to execute the at least one instruction to:
apply the left-eye image and the right-eye image as inputs to the AI model, and
obtain the depth map by obtaining the disparity according to a similarity in intensity values between pixels in the left-eye image and pixels in the right-eye image by using the AI model.

4. The augmented reality device of claim 1, wherein the at least one processor is further configured to execute the at least one instruction to:
define the plane to include a second pixel having the normal vector with the modified direction and the plurality of pixels that are adjacent to the second pixel,
obtain the depth values of the plurality of pixels based on a plurality of points where the defined plane and a ray vector of the at least one camera meet each other,
obtain a difference value between the depth value of the second pixel and each of the depth values of the plurality of pixels, and
obtain the loss by performing a weighted sum in which a weight is applied to the difference value obtained with respect to each of the plurality of pixels.

5. The augmented reality device of claim 4, wherein the weight comprises a first weight determined based on a distance between each of the plurality of pixels in the depth map and the at least one camera, and a second weight determined based on a difference in intensity values between the first pixel of the depth map and each of the plurality of pixels.

6. The augmented reality device of claim 5, wherein the at least one processor is further configured to execute the at least one instruction to obtain an adjusted depth map by performing inference in which the left-eye image and the right-eye image are provided to the trained AI model.

7. The augmented reality device of claim 1, wherein the at least one camera comprises a left-eye camera configured to obtain the left-eye image and a right-eye camera configured to obtain the right-eye image, and
wherein the at least one processor is further configured to execute the at least one instruction to:
modify the direction of the normal vector in the left-eye image and the right-eye image according to the gravity direction or a direction perpendicular to the gravity direction,
perform a plane hypothesis along the modified direction of the normal vector or a direction perpendicular to the modified direction of the normal vector,
obtain the depth value of the at least one pixel by performing a plane sweep along a plane defined through the plane hypothesis, and
modify the depth value of the at least one pixel by using the depth value.

8. The augmented reality device of claim 1, wherein the at least one camera comprises a time-of-flight (ToF) camera, and
wherein the at least one processor is further configured to execute the at least one instruction to obtain the depth map by using the ToF camera.

9. The augmented reality device of claim 8, wherein the at least one processor is further configured to execute the at least one instruction to:
define a plane for each pixel of the at least one pixel, based on the normal vector with the modified direction,
identify a plane region of the plane defined in the depth map, based on regions segmented according to color information of an RGB image, and
adjust the depth value, based on depth values of pixels in the plane region.

10. A method, performed by an augmented reality device, of adjusting a depth value, the method comprising:
obtaining a left-eye image and a right-eye image by using at least one camera;
obtaining a depth map by calculating a disparity between the left-eye image and the right-eye image by applying the left-eye image and the right-eye image as inputs to an artificial intelligence (AI) model;
obtaining a normal vector of at least one pixel included in the depth map;
modifying a direction of the normal vector of the at least one pixel based on a gravity direction measured by an inertial measurement unit (IMU) sensor;
obtaining a loss of the depth map obtained by the AI model, based on depth values of a first pixel on a plane defined by the normal vector with the modified direction and a plurality of pixels that are adjacent to the first pixel; and adjusting the depth value of the at least one pixel, through the AI model trained by applying the obtained loss.

11. The method of claim 10, wherein the obtaining the depth map comprises:

providing the left-eye image obtained by using a left-eye camera and the right-eye image obtained by using a right-eye camera to the AI model; and obtaining the depth map by obtaining a disparity according to a similarity in intensity values between pixels in the left-eye image and pixels in the right-eye image by using the AI model.

12. The method of claim 10, wherein the calculating of the loss comprises:

defining the plane to include a second pixel having the normal vector with the modified direction and the plurality of pixels that are adjacent to the second pixel;

obtaining depth values of the plurality of pixels based on a plurality of points where the defined plane and a ray vector of the at least one camera meet each other;

obtaining a difference value between the depth value of the second pixel and each of the depth values of the plurality of pixels; and obtaining the loss by performing a weighted sum in which a weight is applied to the difference value obtained with respect to each of the plurality of pixels.

13. The method of claim 12, wherein the weight comprises a first weight determined based on a distance between each of the plurality of pixels in the depth map and the at least one camera, and a second weight determined based on a difference in intensity values between the first pixel of the depth map and each of the plurality of pixels.

14. The method of claim 13, further comprising obtaining an adjusted depth map by performing inference in which the left-eye image and the right-eye image are provided to the trained AI model.

15. The method of claim 10, wherein the modifying the direction of the normal vector for each pixel comprises:

modifying the direction of the normal vector of the left-eye image obtained by using a left-eye camera and the right-eye image obtained by using a right-eye camera according to the gravity direction or a direction perpendicular to the gravity direction, and wherein the adjusting of the depth value of the at least one pixel comprises:

performing a plane hypothesis along the modified direction of the normal vector or a direction perpendicular to the modified direction of the normal vector;

obtaining the depth value by performing a plane sweep along the plane defined through the plane hypothesis; and adjusting the depth value of the at least one pixel by using the depth value.

16. The method of claim 10, wherein the obtaining the depth map comprises obtaining the depth map by using a time-of-flight camera.

17. The method of claim 16, wherein the modifying the depth value of the at least one pixel comprises:

defining a plane for each pixel of the at least one pixel, based on the normal vector with the modified direction;

identifying a plane region of the plane defined in the depth map based on regions segmented according to color information of an RGB image; and adjusting the depth value of the at least one pixel, based on depth values of adjacent pixels in the plane region.

18. A non-transitory computer-readable storage medium comprising instructions that are executed by an augmented reality device to perform a method comprising:

obtaining a left-eye image and a right-eye image by using at least one camera;

obtaining a depth map by calculating a disparity between the left-eye image and the right-eye image by applying the left-eye image and the right-eye image as inputs to an artificial intelligence (AI) model;

obtaining a normal vector of at least one pixel included in the depth map;

modifying a direction of the normal vector of the at least one pixel based on a gravity direction measured by an inertial measurement unit sensor;

obtaining a loss of the depth map obtained by the AI model, based on depth values of a first pixel on a plane defined by the normal vector with the modified direction and a plurality of pixels that are adjacent to the first pixel; and adjusting a depth value of the at least one pixel, through the AI model trained by applying the obtained loss.

* * * * *